United States Patent
Cannon et al.

(10) Patent No.: US 8,238,362 B2
(45) Date of Patent: *Aug. 7, 2012

(54) BURST PROCESSING MODEM AND RELATED METHODS

(75) Inventors: Richard Hollingsworth Cannon, Mesa, AZ (US); John Scott Crockett, Maricopa, AZ (US); Cris M. Mamaril, Mesa, AZ (US); Mark Dale, Scottsdale, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 410 days.

This patent is subject to a terminal disclaimer.

(21) Appl. No.: 12/641,096

(22) Filed: Dec. 17, 2009

(65) Prior Publication Data

US 2010/0091777 A1 Apr. 15, 2010

Related U.S. Application Data

(60) Provisional application No. 61/138,196, filed on Dec. 17, 2008.

(51) Int. Cl.
*H04J 3/00* (2006.01)
*H04B 1/38* (2006.01)
(52) U.S. Cl. ......... 370/464; 370/480; 375/222; 375/219
(58) Field of Classification Search .................. None
See application file for complete search history.

(56) References Cited

U.S. PATENT DOCUMENTS

| | | | |
|---|---|---|---|
| 6,898,235 B1 * | 5/2005 | Carlin et al. | 375/219 |
| 6,907,083 B2 | 6/2005 | Lillington | |
| 6,990,060 B2 | 1/2006 | Butash | |
| 7,483,498 B2 | 1/2009 | Lillington et al. | |
| 2001/0046225 A1 * | 11/2001 | Schwaller et al. | 370/343 |
| 2005/0265394 A1 * | 12/2005 | Chapman et al. | 370/480 |

OTHER PUBLICATIONS

RF Engines Limited, "The Ventrix Range of Polyphase DFT Cores" http://www.rfel.com/download/D02003-Polyphase%20DFT%20data%20sheet.pdf last viewed on Dec. 2009.

Zimmerman, G. A., "Polyphase—Discrete Fourier Transform Spectrum Analysis for the Search for Extraterrestrial Intelligence Sky Survey" http://ipnpr.jpl.nasa.gov/progress_report/42-107/107N.PDF last viewed on Dec. 2009.

"Filter Design Toolbox" http://www.mathworks.com/access/helpdesk_r13/help/toolbox/filterdesign/quanti10.html last viewed on Jun. 2009.

(Continued)

*Primary Examiner* — Nittaya Juntima
*Assistant Examiner* — Wanda Russell
(74) *Attorney, Agent, or Firm* — Booth Udall, PLC

(57) ABSTRACT

A burst processing modem and related methods. Implementations of a first method of demodulating bursts from a plurality of channels may include receiving a plurality of channels from a received beam and separating the plurality of channels and storing a plurality of frames in a random access memory (RAM) array with a channelizer where each frame of the plurality of frames includes one or more bursts. The method may include serially reading, using a demodulator in response to receiving a timing signal, a desired burst from a frame stored in the RAM array wherein a burst time plan identifying the desired burst is used by a receive frame state machine to generate the timing signal. The method may include demodulating and decoding the desired burst using a demodulator and a decoder to produce a quantity of packet data, and sending the quantity of packet data to a specified destination.

18 Claims, 17 Drawing Sheets

OTHER PUBLICATIONS

McCormack, Paul, "Effects and Benefits of Undersampling in High-Speed ADC Applications" http://www.national.com/appinfo/adc/files/Undersampling.pdf last viewed on Dec. 2009.

"What is TDMA ? An explanation of TDMA", http://www.satsig.net/vsat-equipment/tdma-explanation.htm last viewed on Jun. 2009.

Bellanger et al., "Digital Filtering by Polyphase Network: Application to Sample-Rate Alteration,and Filter Banks", IEEE Transactions on Acoustics, Speech, and Signal Processing, vol. ASSP-24, No. 2, Apr. 1976.

Harris et al., "Digital Receivers and Transmitters Using Polyphase Filter Banks for Wireless Communications", IEEE Transactions on Microwave Theory and Techniques, vol. 51, No. 4, Apr. 2003.

* cited by examiner

BURST PROCESSING MODEM AND RELATED METHODS

CROSS REFERENCE TO RELATED APPLICATIONS

This document claims the benefit of the filing date of U.S. Provisional Patent Application 61/138,196, entitled "Multi-Beam, Multi-Channel Burst Processing Modem" to Cannon, et al which was filed on Dec. 17, 2008, the disclosure of which is hereby incorporated entirely herein by reference.

BACKGROUND

1. Technical Field

Aspects of this document relate generally to systems and methods for transmitting data across a telecommunication channel.

2. Background Art

A wide variety of systems and methods have been devised to allow for the transmission of data information across a telecommunication channel. Generally, such systems include modulators that encode the data in a format that allows it to be transported into the telecommunication channel and demodulators that receive the transported data from the channel and recover the encoded data. The word "modem" is derived from the combination of modulator and demodulator, indicating the paired relationship and function of these components that exists in many data transmission systems. An example of a modulator and demodulator includes a telephone, which receives voice information and modulates it into a signal which is used to modulate a carrier wave signal which is transported by a wire or optical path.

SUMMARY

Implementations of burst processing modems like those disclosed in this document may utilize implementations of a first method of demodulating bursts from a plurality of channels. The method may include receiving a plurality of channels from a received beam and separating the plurality of channels and storing a plurality of frames included in the plurality of channels in a random access memory (RAM) array with a channelizer where each frame of the plurality of frames includes one or more bursts. The method may also include serially reading, using a demodulator in response to receiving a timing signal, a desired burst from a frame stored in the RAM array wherein a burst time plan identifying the desired burst is used by a receive frame state machine to generate the timing signal. The method may include demodulating the desired burst using a demodulator to form a demodulated desired burst, decoding the demodulated desired burst using a decoder to produce a quantity of packet data, and sending the quantity of packet data to a specified destination using a packet traffic processing module.

Implementations of burst processing modems like those disclosed in this document may utilize implementations of a second method of demodulating bursts from a plurality of channels. The method may include receiving a plurality of intermediate frequency (IF) received beams and processing the IF received beams with an IF array to produce a plurality of digitized received beams, each digitized received beam including a plurality of channels. For each of the plurality of digitized received beams, the method may include separating a bandwidth of each channel of the plurality of channels included in a bandwidth of each of the digitized received beams from a bandwidth of each other channel of the plurality of channels and writing a plurality of frames included in the bandwidth of the channel into a RAM array with a channelizer. The method may include reading, using a demodulator in response to receiving a timing signal, a desired burst included in a frame of the plurality of frames from the RAM array from one or more memory addresses within the RAM array wherein the channel, frame, and a location of the desired burst within the frame is included in a burst time plan where the burst time plan is used by a receive frame state machine to generate the timing signal that includes the one or more memory addresses within the RAM array where the desired burst is stored. The method may also include demodulating the desired burst using a demodulator to form a demodulated desired burst, decoding the demodulated desired burst using a decoder to produce a quantity of packet data, and sending the quantity of packet data to a specified destination using a packet traffic processing module.

Implementations of a first method and of a second method of demodulating bursts from a plurality of channels may include one, all, or any of the following:

Separating the plurality of channels and separating the bandwidth of each channel of the plurality of channels included in the bandwidth of each of the digitized received beams from the bandwidth of each other channel of the plurality of channels may both include dividing the bandwidth of an input to a stage in the channelizer into a first copy and a second copy and frequency upconverting and filtering the first copy with a frequency upconverter and first filter to create a first output including a first channel. The methods may further include frequency downconverting and filtering the second copy with a frequency downconverter and second filter to create a second output including a second channel and interleaving the first output and the second output with an interleaver to produce an interleaved stage output signal.

The methods may further include downsampling the first output with a first downsampler and downsampling the second output with a second downsampler prior to interleaving the first output and the second output with an interleaver.

The methods may further include selecting when an output of the interleaver and when a copy of the input to the stage are included in the interleaved stage output signal using a selector multiplexer in response to a control signal in the input to the stage.

Separating the plurality of channels and separating the bandwidth of each channel of the plurality of channels included in the bandwidth of each of the digitized received beams from the bandwidth of each other channel of the plurality of channels may both include processing the plurality of channels with a polyphase filter bank including a plurality of stages each including a downsampler, bandpass filter, and discrete Fourier transform (DFT) module to produce a desired channel.

The methods may further include processing the plurality of channels with two or more polyphase filter banks included in the channelizer where bandpass filters in the stages of one of the two or more polyphase filter banks pass a first number of channels per stage and bandpass filters in the stages of another of the two or more polyphase filter banks pass a second number of channels per stage where the second number is different than the first number.

Implementations of burst processing modems like those disclosed in this document may utilize implementations of a method of combining a plurality of channels including a plurality of frames including one or more bursts. The method may include encoding a quantity of packet data received from a packet traffic processing module to form an encoded quantity of packet data using an encoder and modulating the encoded quantity of packet data using a single modulator to form a burst and writing the burst to a specific location in a RAM array in response to receiving the specified location from a timing signal received from a transmit frame state machine that generates the specified location from a burst time plan that includes a desired location of the burst in a frame, a desired channel for the frame, and a desired beam for the channel. The method may also include reading from the RAM array a plurality of frames that includes the burst, forming a channel with the plurality of frames, and combining the channel with a plurality of channels to form a digitized beam for transmission using a combiner. The method may also include processing the digitized beam for transmission with an IF block to form a beam and sending the beam to a transmitter.

Implementations of a method of combining a plurality of channels including a plurality of frames including one or more bursts may include one, all, or any of the following:

Combining the channel with a plurality of channels may further include deinterleaving an input to a stage included in the combiner to form a first channel signal and a second channel signal, filtering the first channel signal with a first filter to produce a filtered first channel signal, and filtering the second channel signal with a second filter to produce a filtered second channel signal. The method may also include frequency downconverting the filtered first channel signal with a frequency downconverter and frequency upconverting the filtered second channel signal with a frequency upconverter and adding an output of the frequency downconverter to an output of the frequency upconverter to produce a stage output signal with an adder.

The method may further include upsampling the first channel signal with a first upsampler and upsampling the second channel signal with a second upsampler prior to filtering the first channel signal and filtering the second channel signal, respectively.

The method may further include selecting when an output of the adder and a copy of the input to the stage are included in the stage output signal in response to a control signal in the input to the deinterleaver using a selector multiplexer.

Combining the channel with a plurality of channels may further include processing the plurality of channels with a polyphase filter bank including a plurality of stages each including a discrete Fourier transform (DFT) module coupled with a bandpass filter coupled with an upsampler and adding an output of each upsampler in each stage to form a digital beam signal for transmission.

The method may further include processing the plurality of channels with two or more polyphase filter banks where one of the two or more polyphase filter banks contains a plurality of bandpass filters that pass a first number of channels and a second one of the two or more polyphase filter banks contains a plurality of bandpass filters that pass a second number of channels where the first number is different than the second number.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended burst processing modem and/or assembly procedures for a burst processing modem will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such burst processing modems and implementing components, consistent with the intended operation.

In satellite communication systems, particularly Time Division Multiple Access (TDMA) systems, a number of communication sites share access to the same satellite by transmitting to the satellite at specifically assigned short time intervals. The satellite receives the resulting bursts of data, demodulates the data, and forms a frame containing the data from the bursts ordered in time. The length of a burst and its location within the frame are specified in a burst time plan which all of the communication sites and the satellite use to ensure that the bursts are sent and the resulting frames processed properly. The frames are included in channels included in one or more beams used by the satellite in communicating with the communication sites. In particular implementations, a single beam can carry up to 240 channels and each channel can carry a plurality of frames. As used in this document, "channel" refers to a particular segment of a frequency bandwidth assigned to a particular beam. Accordingly, the channels of one beam do not overlap with the channels of any other beam. However, the actual signal received by a communication site from the satellite may be a wideband signal containing all or part of the possible channels associated with that beam. Because the data transported by the wideband signal is in burst form, the data is included as bursts within a plurality of frames within each channel of a plurality of channels within each beam of a plurality of beams.

Figure 1:
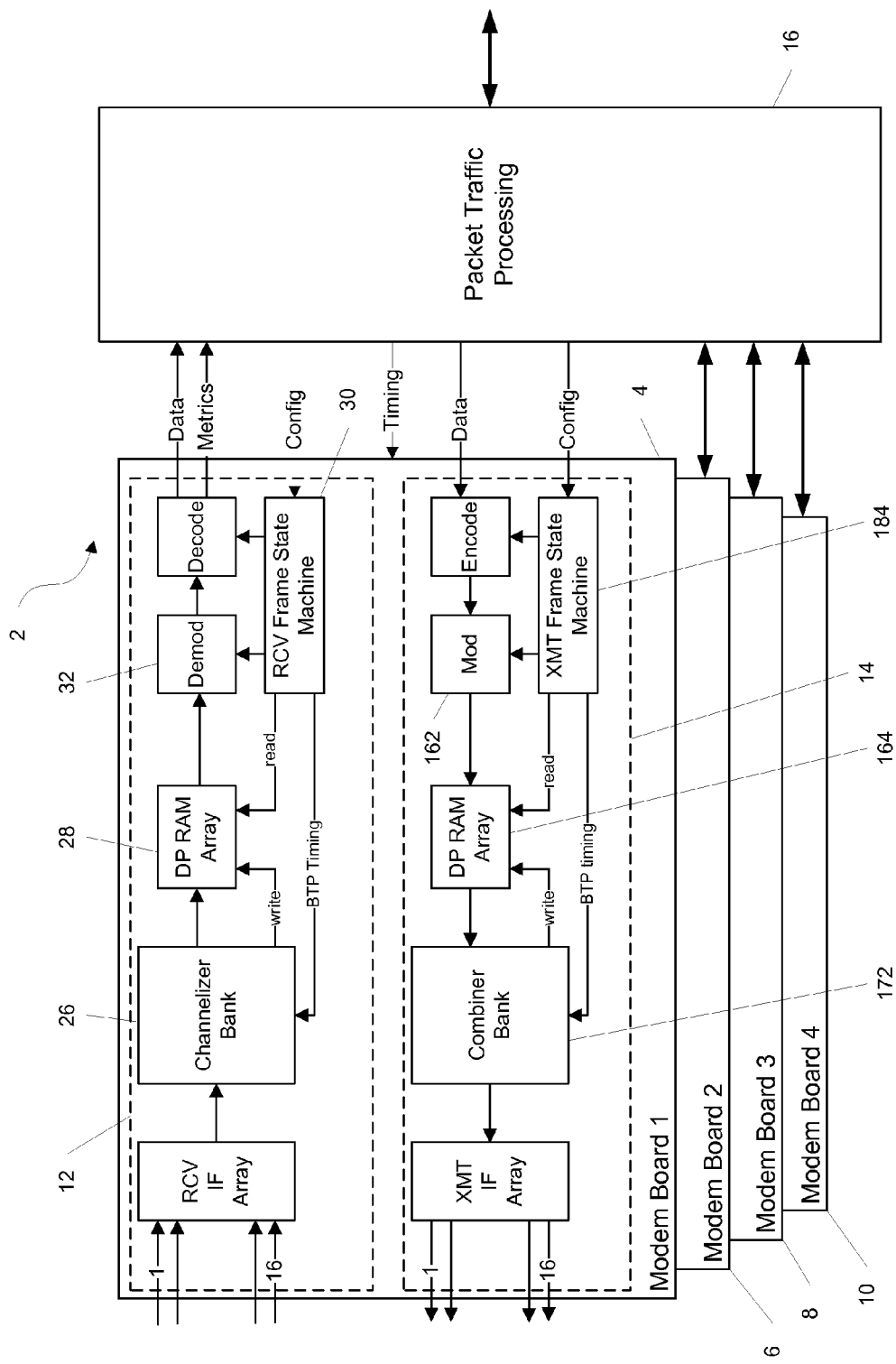
FIG. 1 is a block diagram view of an implementation of a burst processing modem.

In each communication site and satellite itself, a burst processing modem (a modulator and demodulator combination) is included to enable bidirectional communication. Referring to FIG. 1, an implementation of a burst processing modem system 2 is illustrated. As illustrated, the modem system 2 includes several modem boards 4, 6, 8, 10, on which a receive side 12 and a transmit side 14 are included. The receive side 12 and transmit side 14 are coupled together by a packet traffic processing module 16 which serves to route a wide variety of information including, by non-limiting example, data, configuration information, timing information, and performance metrics. While in the implementation illustrated in FIG. 1, the receive side 12 and transmit side 14 are on the same modem board 4, they could also be included in their own board in various implementations. In addition, in various implementations, the functions of the various components of the receive side 12 and the transmit side 14 may be implemented in discrete components or as functional blocks within a piece of executable code included in and/or operated by one or more field programmable gate arrays (FPGAs), application specific integrated circuits (ASICs), digital signal processors (DSPs), and/or as machine readable instructions executable by any type of microprocessor. Accordingly, in particular implementations of the system, no boards or discrete components may be used to form the structure, but the functions and structure of the implementations may be created by the coupling together of various microprocessor and/or memory storage devices and the executing of machine readable instructions that each implement the functions of the system.

Figure 2:
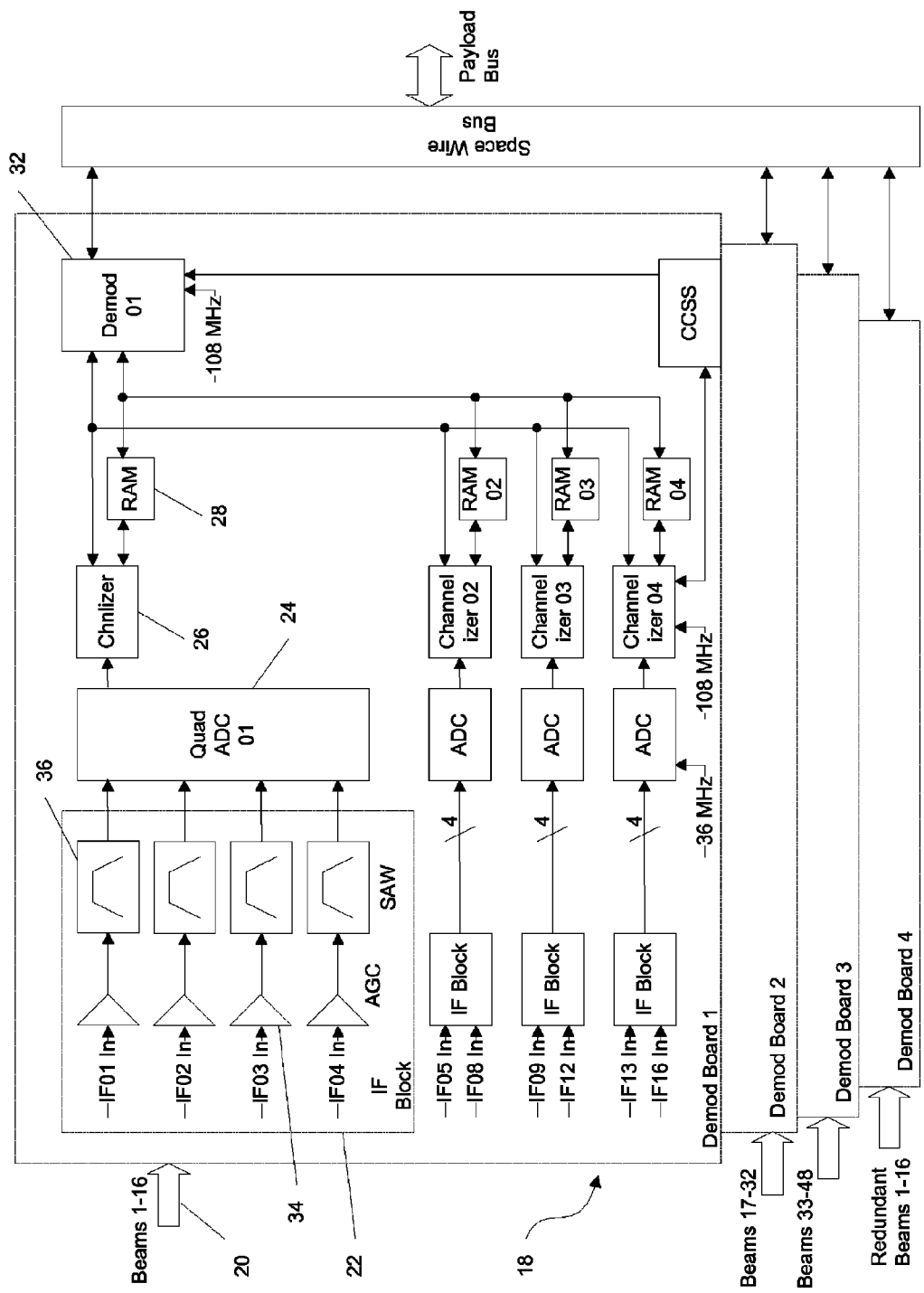
FIG. 2 is detail block view of a portion of the receive side of the burst processing modem implementation illustrated in FIG. 1.

Referring to FIG. 2, a detail view of a portion 18 of the receive side 12 is illustrated. A plurality of beams 20 enter as intermediate frequency (IF) received beams and are processed by an IF block 22 to form a filtered plurality of IF received beam signals. The filtered plurality of IF received beam signals is received by a quadruple analog-to-digital converter 24 (ADC) which simultaneously digitizes the IF received beam signal four beams at a time. The ADC outputs a plurality of channels for each beam (now digitized) to channelizer 26. Channelizer 26 separates the plurality of channels and writes each channel's data into random access memory (RAM) array 28, which may be a dual port RAM array in particular implementations. The use of dual port RAM allows the simultaneous access of information stored in different addresses in the RAM array on the same clock cycle. RAM arrays composed of dual port RAM may allow for the use of a single RAM array shared between the receive side 12 and the transmit side 14 in particular implementations. Referring to FIGS. 1 and 2, a receive frame state machine 30 is coupled to the RAM array 28 and to demodulator 32. The receive frame state machine 30 utilizes a burst time plan for each received frame, which includes information about where each burst is located within a particular frame of the plurality of frames within each channel of the plurality of channels within the received beam. The receive frame state machine 30 uses the burst time plan to create one or more timing signals that are sent to the channelizer 26 and/or demodulator 32. The demodulator 32 uses the one or more timing signals to know what memory addresses within the RAM array 28 contain desired burst data within a received frame in a particular channel thereby allowing the demodulator 32 to only process bursts within the frame that are desired. Because not all of the channels or even all of the frames include bursts needed by a particular communication site, not processing bursts, frames, or channels that are not relevant with the demodulator 32 serves to reduce system overhead and/or consumption of system resources.

By inspection, the implementation of a burst processing modem 2 illustrated in FIGS. 1 and 2 is configured to allow the processing of four beams per channelizer 26; accordingly, each receive side 12 includes first, second, third, and fourth channelizers and RAM arrays coupled together, respectively, all coupled to a single demodulator 32. The resulting system is capable of handling 16 beams per receive side 12. In addition, implementations of the IF block 22 include an automatic gain control (AGC) amplifier 34 and filter 36 (which may be a surface acoustic wave filter in particular implementations) to process each IF received beam prior to processing by the ADC 24.

Figure 3:
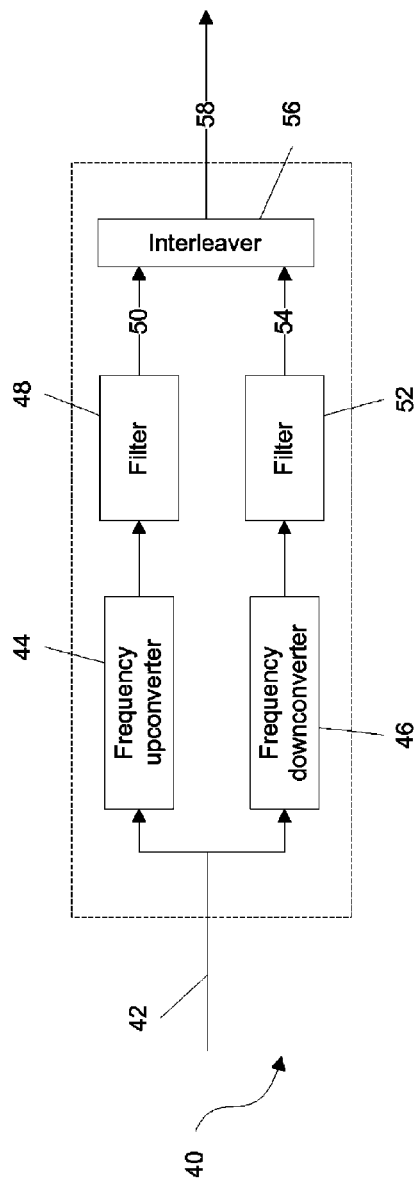
FIG. 3 is a block diagram of a first implementation of a channelizer stage.

Referring to FIG. 3, implementations of a channelizer 26 may take a number of forms, including channelizer implementations that are composed of one or more stages. In FIG. 3, an implementation of a first implementation of a channelizer stage 40 is illustrated. As illustrated, input 42 is divided and a portion is sent to frequency upconverter 44 and to frequency downconverter 46. Frequency upconverter 44 serves to center an upper portion of the bandwidth of the signal included in the input 42 over zero while frequency down converter 46 centers a lower portion of the bandwidth over zero. After passing through first filter 48 (which may be a low pass filter in particular implementations, the output 50 of the first filter 48 contains only half of the original bandwidth of the input 42, the upper half. After passing through second filter 52, the output 54 of the second filter 52 also contains only half of the original bandwidth of the input 42, the lower half. Outputs 50 and 54 are subsequently received by interleaver 56, which interleaves the two outputs 50, 54 to create interleaved stage output signal 58.

Figure 4:
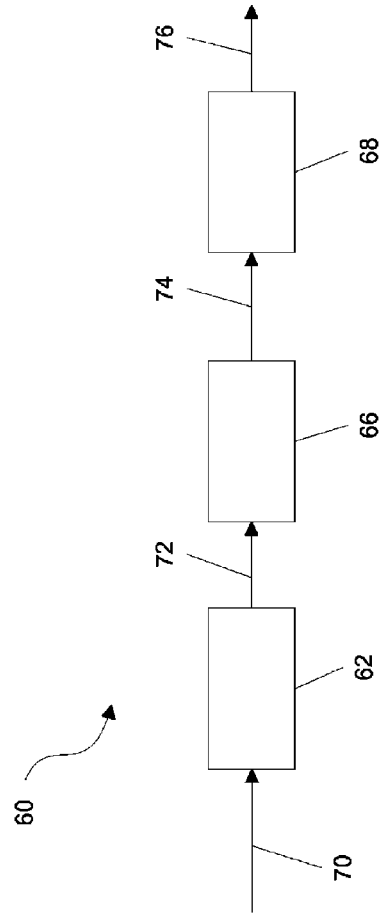
FIG. 4 is a block diagram of a first implementation of a channelizer.

Referring to FIG. 4, a first implementation of a channelizer 60 is illustrated. The channelizer 60 includes one or more stages 62, 66, and 68 coupled together. Each of the stages has the structure of the stage implementation illustrated in FIG. 3. Stage 62 receives input 70 and generates interleaved stage output signal 72, which contains two signals, each with half of the bandwidth of the input 70. A deinterleaver (not shown) is used as part of stage 66, which receives the interleaved stage output signal 72 and generates interleaved stage output signal 74, which now contains four signals, each with one quarter the bandwidth of the input 70. Stage 68 receives interleaved stage output signal 74 and generates channelizer output signal 76, which is an interleaved signal containing eight signals, each with one eighth of the bandwidth of the input 70. By using interleaving, the process of separating 8 channels included in the input 70 is accomplished in three successive stages. In contrast, a more conventional approach that does not use interleaving, but rather relies exclusively on successive division, would require seven stages, and would result in eight separate stage output signals. An effect of utilizing interleaving is that the output signal from any stage will have twice the sample rate of the input stage. The structure of the stage 40 and channelizer 60 implementations illustrated in FIGS. 3 and 4 are like those disclosed in U.S. Pat. No. 6,907,083 (the '083 patent) to John Lillington entitled "Frequency Analysis," issued Jun. 14, 2005, the disclosure of which is hereby incorporated entirely herein by reference.

Figure 5:
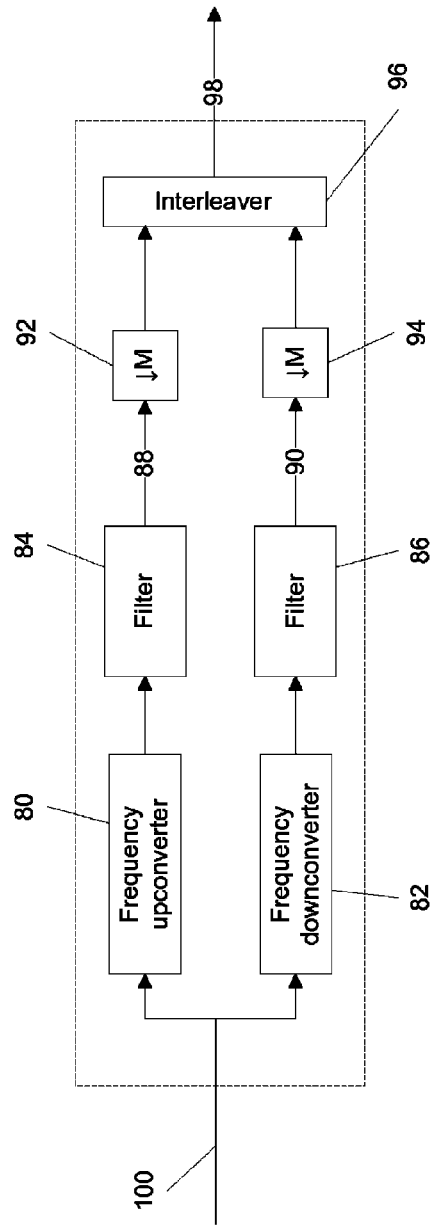
FIG. 5 is a block diagram of a second implementation of a channelizer stage.

Referring to FIG. 5, a second implementation of a channelizer stage 78 is illustrated. As illustrated, the stage 78 includes a frequency upconverter 80 and frequency downconverter 82 coupled to a first filter 84 and a second filter 86. The output 88 of the first filter 84, however, is downsampled by a first downsampler 92 coupled to the first filter 84. Correspondingly, the output 90 of the second filter 86 is downsampled by second downsampler 94. The outputs of the first downsampler 92 and the second downsampler 94 are received by interleaver 96 and interleaved to form interleaved stage output signal 98. Because in particular implementations the downsampling may be by a factor of two (which can occur without any data loss if done properly), the sample rate of the interleaved stage output signal 98 may be the same as the sample rate of an input 100 to the stage 78.

Figure 6:
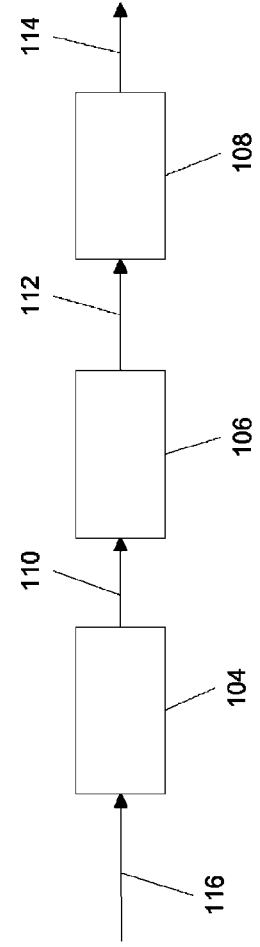
FIG. 6 is a block diagram of a second implementation of a channelizer.

Referring to FIG. 6, a second implementation of a channelizer 102 is illustrated that includes three stages 104, 106, 108 like the implementation illustrated in FIG. 5. Because of the use of downsampling, the sample rate of the various stage output signals 110, 112, and the channelizer output signal 114 may be the same as the sample rate of the input signal 116 to the channelizer 102. Implementations of stages and channelizers like those illustrated in FIGS. 5 and 6 are like those disclosed in the '083 patent previously incorporated by reference.

Figure 7:
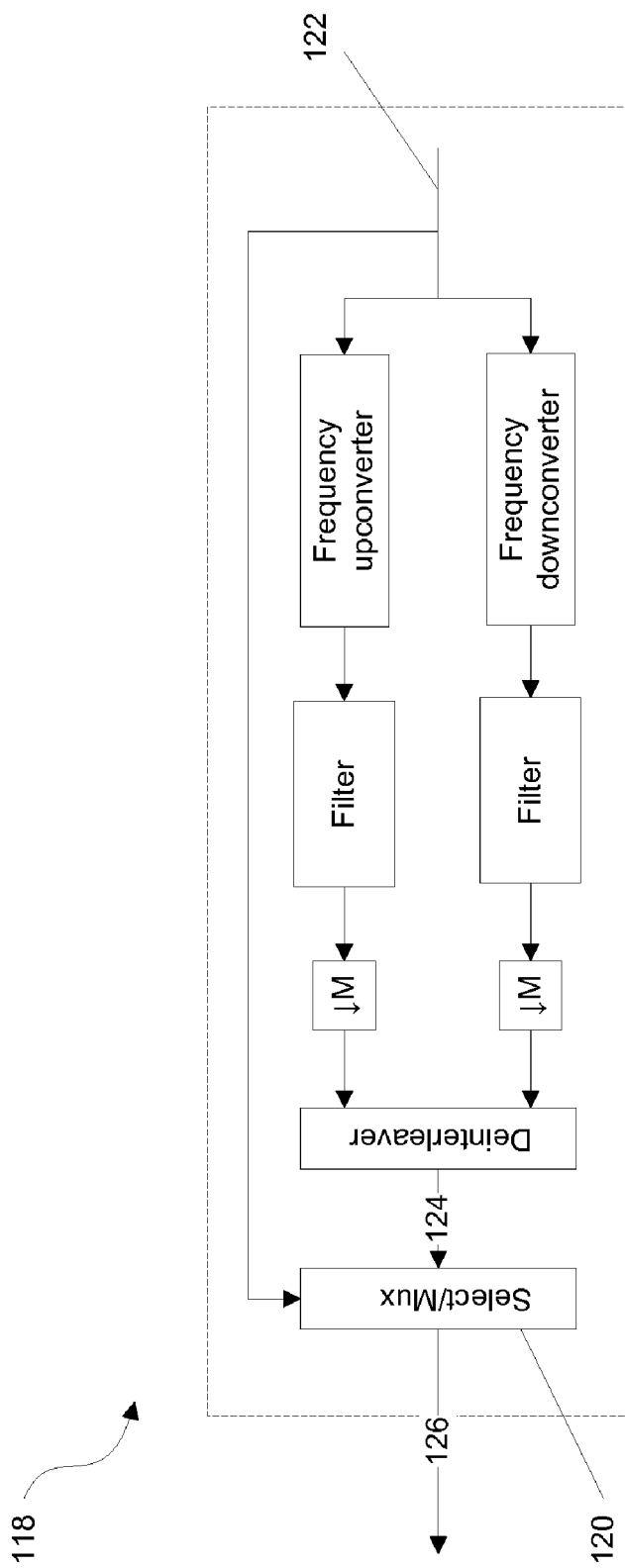
FIG. 7 is a block diagram of a third implementation of a channelizer stage.

Referring to FIG. 7, a third implementation of a channelizer stage 118 is illustrated. Like the previously discussed stage implementations 40 and 78, the channelizer stage 118 includes a frequency upconverter, frequency downconverter, a pair of filters, a pair of down samplers and a deinterleaver. The stage 118 also includes a selector multiplexer 120 coupled to the input 122 to the stage 118 and to the output 124 from the deinterleaver. The selector multiplexer 120 allows for the inclusion of data either from the output 124 from the deinterleaver or from the input 122. In particular implementations, control information may be included in the input 122 which serve to enable the selector multiplexer 120 to select which of the output 124 from the deinterleaver or the input 122 to include in a channelizer output signal 126. Because a signal from the input 122 can be included in the channelizer output signal 126, the control information can be used to enable "bypassing" of a stage by particular channels. In various implementations, the channels may not all have the same bandwidth; for example, the input 122 may include two channels of equal bandwidth and a third channel that has twice the bandwidth of either of the two channels. Because the third channel does not have the same bandwidth as the other channels, were it to be processed through the channelizer stage without bypassing, the channel data would be lost. By using control data to govern the operation of the selector multiplexer 120, the third channel can be passed into the channelizer output signal 126 and interleaved with the two channels of equal bandwidth, which have been separated by passing through the stage 118. The foregoing principle can be used to allow channels of any width that is a power of two of the smallest channel size to bypass a particular stage.

Figure 8:
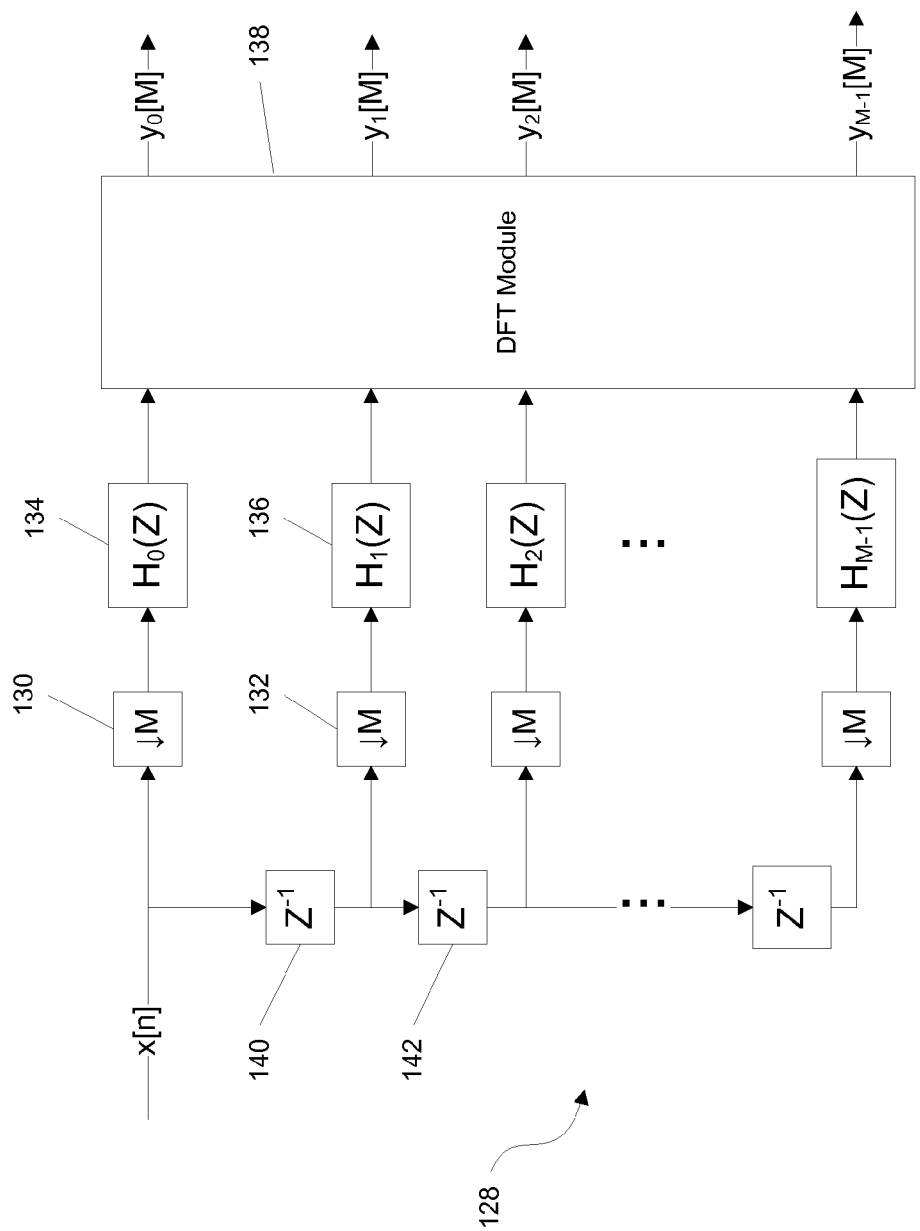
FIG. 8 is a block diagram of a third implementation of a channelizer.

Referring to FIG. 8, a third implementation of a channelizer 128 is illustrated. The channelizer 128 shown is a block diagram view of a polyphase filter bank. In the channelizer 128, each stage includes a downsampler 130, 132 coupled with a bandpass filter 134, 136 coupled to discrete Fourier transform (DFT) module 138. Index markers 140, 142 assist in the separation of the various channels in wideband signal x[n] into various narrowband signals y[n] as individual channels. Because the bandpass filters 134, 136 pass only the bandwidth of the wide band signal x[n] that corresponds with a particular individual channel, the channelizer 128 has as many stages as there are channels to be separated, and has as many outputs as channels that are separated. Additional teachings regarding the structure, operation, and use of polyphase filter banks as channelizers may be found in the paper by Fredric J. Harris et al. entitled "Digital Receivers and Transmitters Using Polyphase Filter Banks for Wireless Communications," *IEEE Transactions on Microwave Theory and Techniques*, p. 1395-1412, Vol. 51, No. 4 (April 2003), the disclosure of which is hereby incorporated entirely herein by reference.

Figure 9:
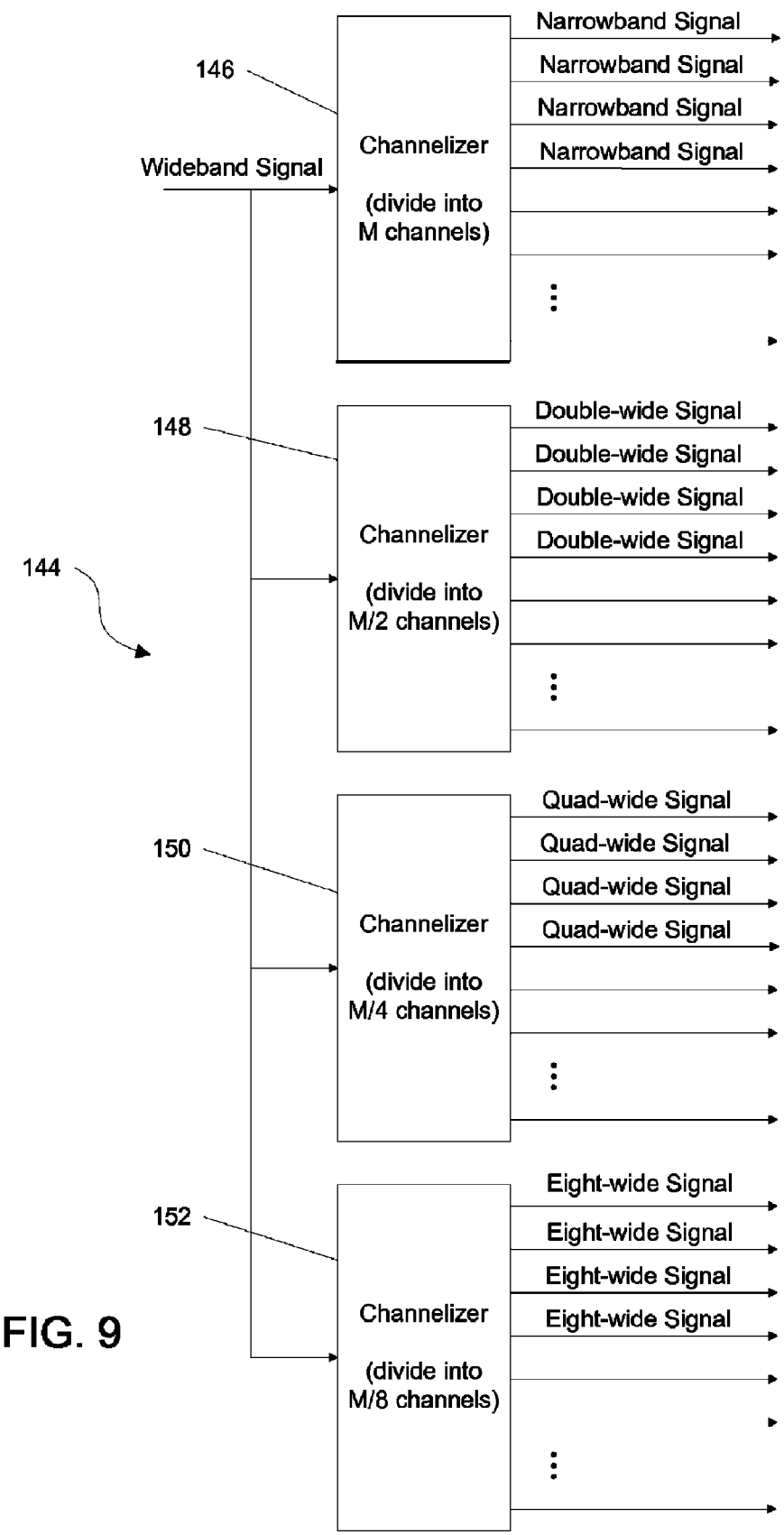
FIG. 9 is a block diagram of a fourth implementation of a channelizer.

Referring to FIG. 9, a fourth implementation of a channelizer 144 is illustrated. As illustrated, the channelizer 144 contains four polyphase filter banks 146, 148, 150, 152 that each may have a structure like the implementation illustrated in FIG. 8. As illustrated, a wideband signal enters the channelizer 144, and based on control information contained in or accompanying the wideband signal, a particular polyphase filter bank 146, 148, 150, or 152 is selected to process the wideband signal into a plurality of narrowband signals. If polyphase filter bank 146 is selected, then the wideband signal will be separated a plurality of narrowband signals, each as wide as a single channel, because the bandpass filters in polyphase filter bank 146 are designed to pass only one channel per stage. If polyphase filter bank 148 is selected, then the wideband signal will be separated into a plurality of double-wide signals because the bandpass filters in polyphase filter bank 148 are designed to pass two channels per stage. In other words, the bandpass filters of polyphase filter bank 146 are designed to pass a first number of channels per stage (one channel per stage) and the bandpass filters of polyphase filter bank 148 are designed to pass a second number of channels per stage (two channels per stage) where the second number is different than the first number. Implementations of channelizers 144 may be used to allow for the processing of variously wide channels, including channels that have unequal widths, where a logic circuit, such as, by non-limiting example, a commutator, state machine, or other switching device is used to ensure that only certain portions of the wideband signal are processed by particular polyphase filters banks 146, 148, 150, 152 that correspond with the channel size in the certain portions.

In other implementations, the wideband signal may be processed simultaneously by all of the polyphase filter banks 146, 148, 150, and 152 and a logic circuit like those previously disclosed may be used to select from the outputs of the various polyphase filter banks the ones that correspond to the actual channel widths contained in the wide band signal. For example, if the wideband signal contains an eight-wide, quad-wide, and four narrowband (single-wide) signals, then the logic circuit would select the four outputs from polyphase filter bank 146 that correspond with the four narrowband signals (either the upper four outputs or lowest four outputs of polyphase filter bank 146, because of the constraint of this design that N-wide channels are on N-channel boundaries, or in other words, that the number of channels in each half of the bandwidth of the wideband signal is divisible by two). The second from the top or second from the bottom output of polyphase filter bank 150 would then be selected, depending upon the position of the quad-wide signal, and the second from the top or second from the bottom output of polyphase filter bank 152 would be selected, depending upon the position of the eight-wide signal in the bandwidth of the wideband signal. In this way, the desired channels can be retrieved from the bandwidth of the wideband signal.

Figure 10:
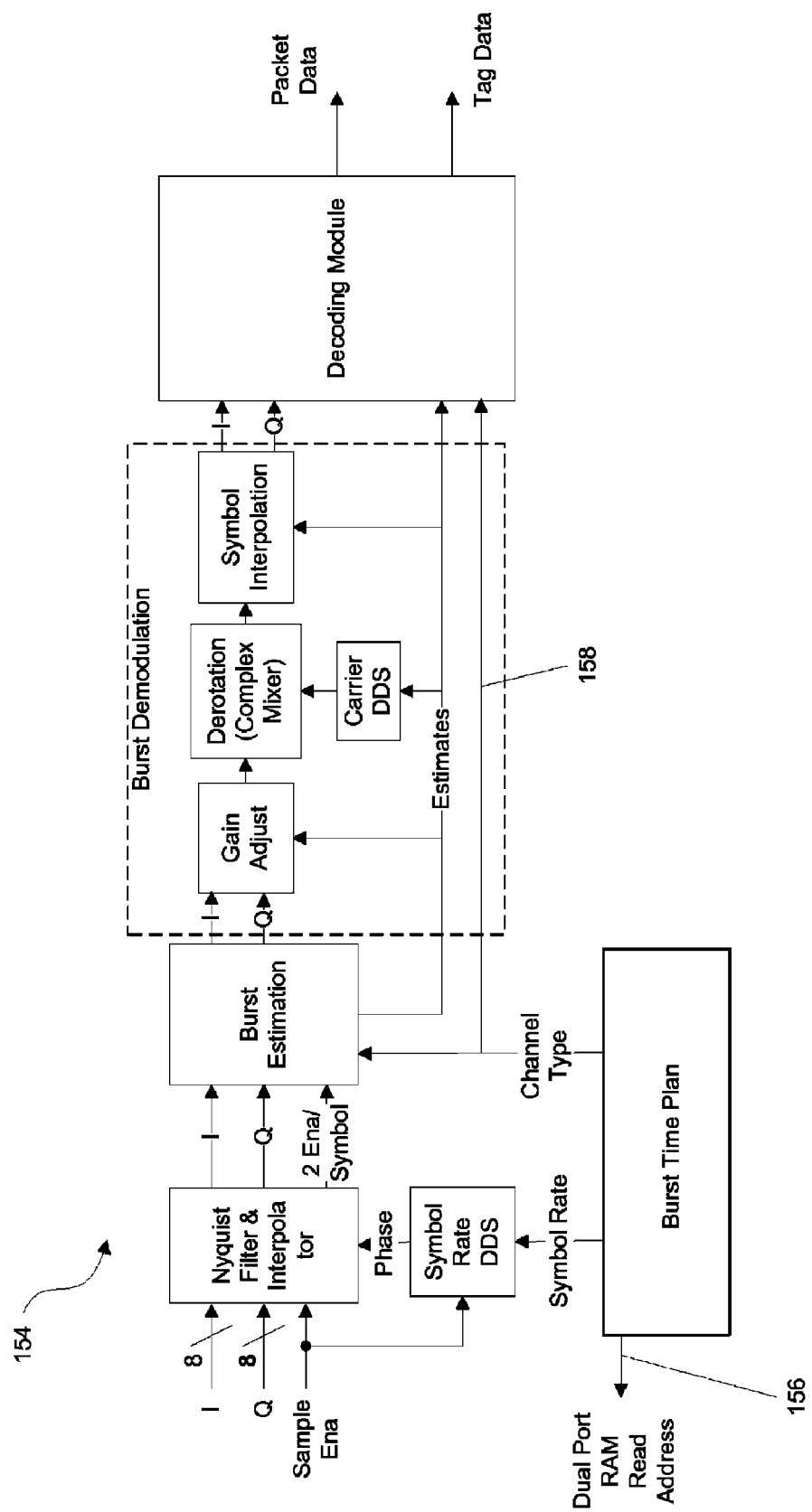
FIG. 10 is a block diagram of an implementation of a demodulator.

Referring to FIG. 10, an implementation of a demodulator 154 that may be used in particular implementations of burst processing modems disclosed in this document. Here, because the demodulator 154 operates to demodulate a burst, rather than a continuous stream of information, the components of the demodulator 154 are designed to be able to rapidly acquire the burst and demodulate it into a quantity of packet data that will be sent to a decoding module for decoding. As illustrated, the burst time plan (as utilized by the frame state machine) is used to develop a set of dual port RAM read address values in a timing signal 156 that are used to retrieve the bursts to be processed by the demodulator 154. The demodulator 154 implementation illustrated in FIG. 10 includes a feedback loop 158 and is designed to process bursts that contain a conventional burst structure that includes a carrier acquisition portion followed by a unique word. Other types and components may be contained in various demodulator implementations depending upon the structure of the burst that needs to be demodulated. An example of another demodulator type that can be used to demodulate bursts in various implementations of burst processing modems like those disclosed in this document as well as the structure of a burst that may be used with such implementations may be found in copending U.S. patent application Ser. No. 12/553,045 to Eymann, et al., entitled "Burst Demodulator," filed Sep. 2, 2009, the disclosure of which is hereby incorporated entirely herein by reference.

Figure 11:
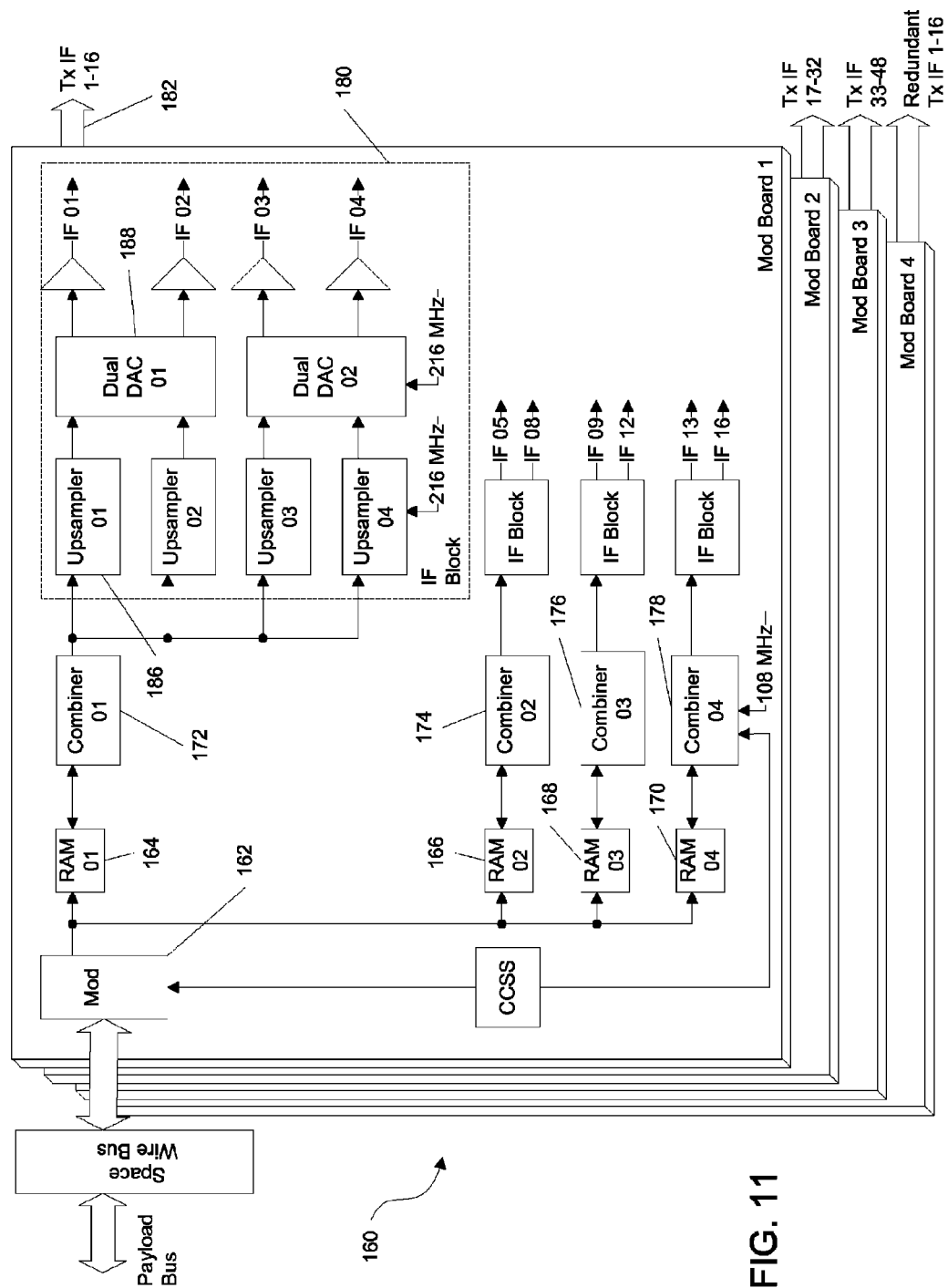
FIG. 11 is a detail block view of a portion of the transmit side of the burst processing modem implementation illustrated in FIG. 1.

Referring to FIG. 11, a detail view of a portion 160 of the transmit side 14 of the burst processing modem 2 implementation illustrated in FIG. 1 is shown. As illustrated, a modulator 162 (which may be a single modulator in particular implementations) is coupled to RAM arrays 164, 166, 168, 170 which are coupled to combiners 172, 174, 176, and 178, respectively. While in the implementation of the portion 160 illustrated in FIG. 11 four RAM arrays and four combiners are utilized, two or more RAM arrays and two or more combiners (combiner banks) or fewer may be utilized in various implementations. Each combiner 172, 174, 176, and 178 is coupled with an IF block 180 that serves to process and digitize a modulated plurality of channels created by each combiner 172, 174, 176, and 178 for each of the plurality of beams to be transmitted (or for transmission) 182. As with the demodulator implementations disclosed in this document, the RAM arrays may be dual port RAM arrays. Referring to FIG. 1, a transmit frame state machine 184 is coupled with the combiners, the RAM arrays and, in particular implementations, with the modulator 162. The transmit frame state machine 184 functions analogously to the receive frame state machine 30 in that it utilizes the burst time plan to generate a timing signal that permits the combiner 172 to assemble the bursts in the proper time order within each frame of a plurality of frames associated with a particular one of a plurality of modulated channels stored in the RAM array 164. The plurality of modulated channels are created from data included in a plurality of data packets received from packet traffic processing module 16, which are modulated and which may, in particular implementations, be written at a high rate into the RAM arrays to enable them to be upsampled by upsampler 186 and sampled by digital-to-analog converter (DAC) 188 (which may have a higher sample rate than the ADC 24 due to sin(x)/x considerations and may operate on two beams at once). In the implementation illustrated in FIG. 11, sixteen beams may be produced by the operation of a single modulator with four combiners and four RAM arrays.

Figure 12:
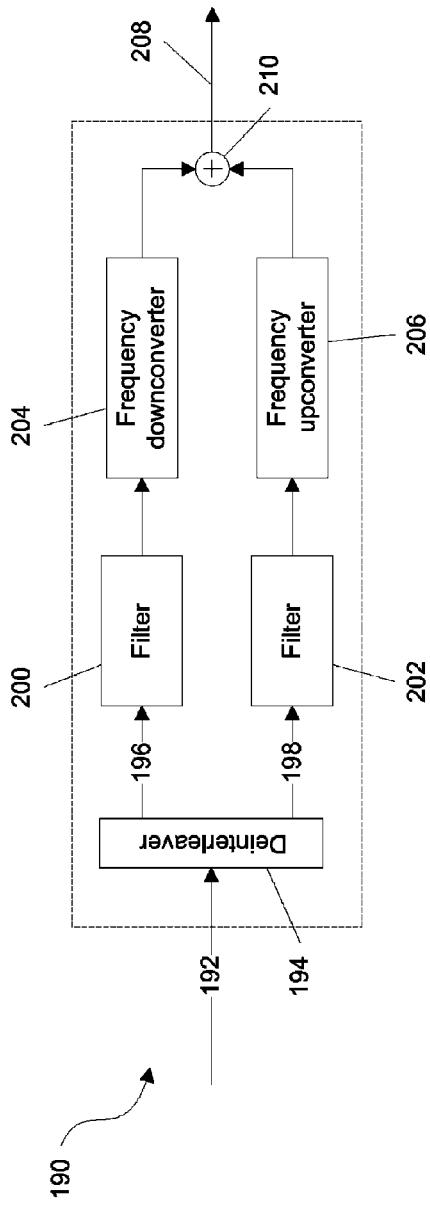
FIG. 12 is a block diagram of a first implementation of a combiner stage.

Combiners 172, 174, 176, and 178 may include various structures depending upon the desired operation of the burst processing modem implementation. Referring to FIG. 12, a first implementation of a combiner stage 190 is illustrated. Interleaved input 192 containing two or more channels is received by deinterleaver 194 which produces a first channel signal 196 and a second channel signal 198. The first channel signal 196 is filtered by a first filter 200 and processed by a frequency downconverter 204, which places the bandwidth of the first channel signal 196 in the lower portion of the bandwidth of a stage output signal 208. The second channel signal 198 is filtered by a second filter 202 and processed by a frequency upconverter 206 to place the bandwidth of the second channel signal 198 in an upper portion of the bandwidth of the stage output signal 208. Adder 210 adds the outputs of the frequency upconverter and frequency downconverter to form stage output signal 208 (combined output), with the first channel signal 196 and second channel signal 198 included in the stage output signal 208 which has twice the bandwidth of the interleaved input 192 and half its sample rate.

Figure 13:
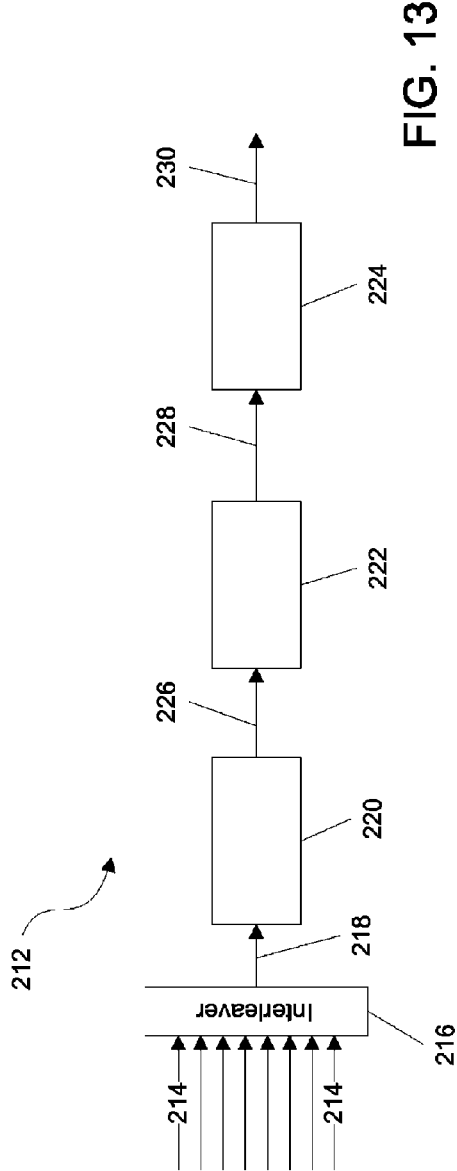
FIG. 13 is a block diagram of a first implementation of a combiner (combiner bank)

Referring to FIG. 13, a block diagram of a first implementation of a combiner 212 is illustrated. As illustrated, a plurality of input channels 214 are received by interleaver 216 which interleaves them to form interleaved input 218 to stage 220 that contains all of the data from the input channels. Stage 220 combines half of the channels to form interleaved output 226, stage 222 combines half of the channels in output 226 to form output 228, and stage 224 completes the combination of the remaining channels in output 228 to form non-interleaved combiner output signal 230, which is a wideband signal with a bandwidth equal to the sum of bandwidths of the plurality of input channels 214 and with a sample rate equal to one eighth of the sample rate of each individual input channel 214.

Additional disclosure regarding the structure, use, and operation of implementations of combiner stages and combiners discussed above and illustrated in FIGS. 12 and 13 may be found in U.S. patent application Ser. No. 12/552,576 (the '576 application) to John Crockett entitled "Combiner System and Related Methods," filed Sep. 2, 2009, the disclosure of which is hereby incorporated entirely herein by reference.

Figure 14:
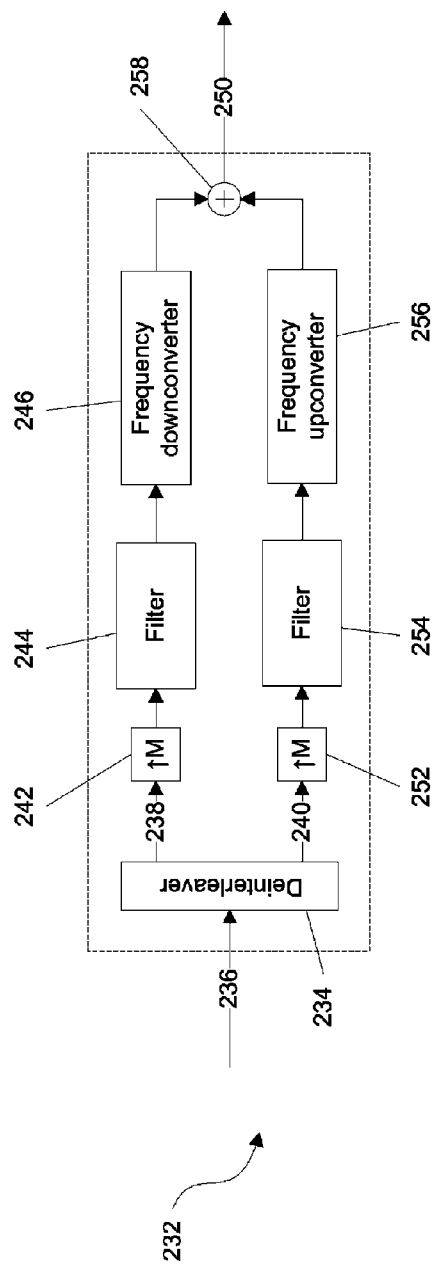
FIG. 14 is a block diagram of a second implementation of a combiner stage.

Referring to FIG. 14, a block diagram of a second implementation of a combiner stage 232 is illustrated. Like the combiner stage implementation illustrated in FIG. 12, the stage 232 includes a deinterleaver 234 that deinterleaves interleaved input signal 236 to form a first channel signal 238 and a second channel signal 240. First channel signal 238 is upsampled by upsampler 242 to twice its sample rate (which can be accomplished without losing or corrupting the data in the first channel signal 238) and then filtered by filter 244 and frequency downconverted by frequency downconverter 246 to place the bandwidth of the first channel signal 238 in a lower portion of the bandwidth of a stage output signal 250. Similarly, second channel signal 240 is upsampled by upsampler 252, filtered by filter 254, and frequency upconverter 256 to place the bandwidth of the second channel signal 240 in the upper portion of the bandwidth of the stage output signal 250. Adder 258 adds the outputs of the frequency downconverter 246 and frequency upconverter 256 to form the stage output signal 250 that has twice the bandwidth of the interleaved input signal 236 and the same sample rate, due to the upsampling of the signals.

Figure 15:
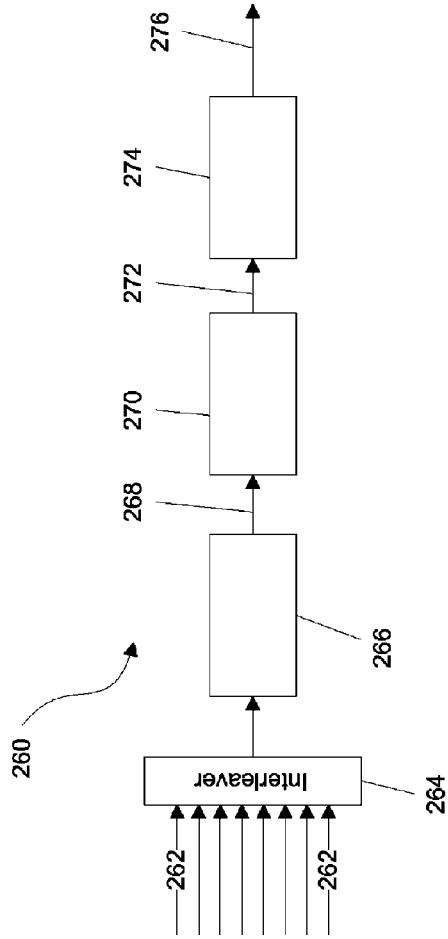
FIG. 15 is a block diagram of a second implementation of a combiner.

Referring to FIG. 15, a block diagram of an implementation of a second implementation of a combiner 260 is illustrated. As illustrated, a plurality of input channels 262 are received by interleaver 264, interleaved, and processed by stage 266 (an implementation like those illustrated in FIG. 14), which produces interleaved output 268 that has half of the input channels 262 combined. Stage 270 takes interleaved output 268 and combines half of the input channels 262 again to produce interleaved output 272. Stage 274 takes interleaved output 272 and completes the combination of the channels to produce non-interleaved combiner output 276, which has a bandwidth equal to the combined bandwidth of each of the input channels 262 and a sample rate identical to that of the input channels 262. Additional disclosure regarding the structure and teachings of second implementations of combiner stages and second implementations of combiners may be found in the '576 application, previously incorporated by reference.

Figure 16:
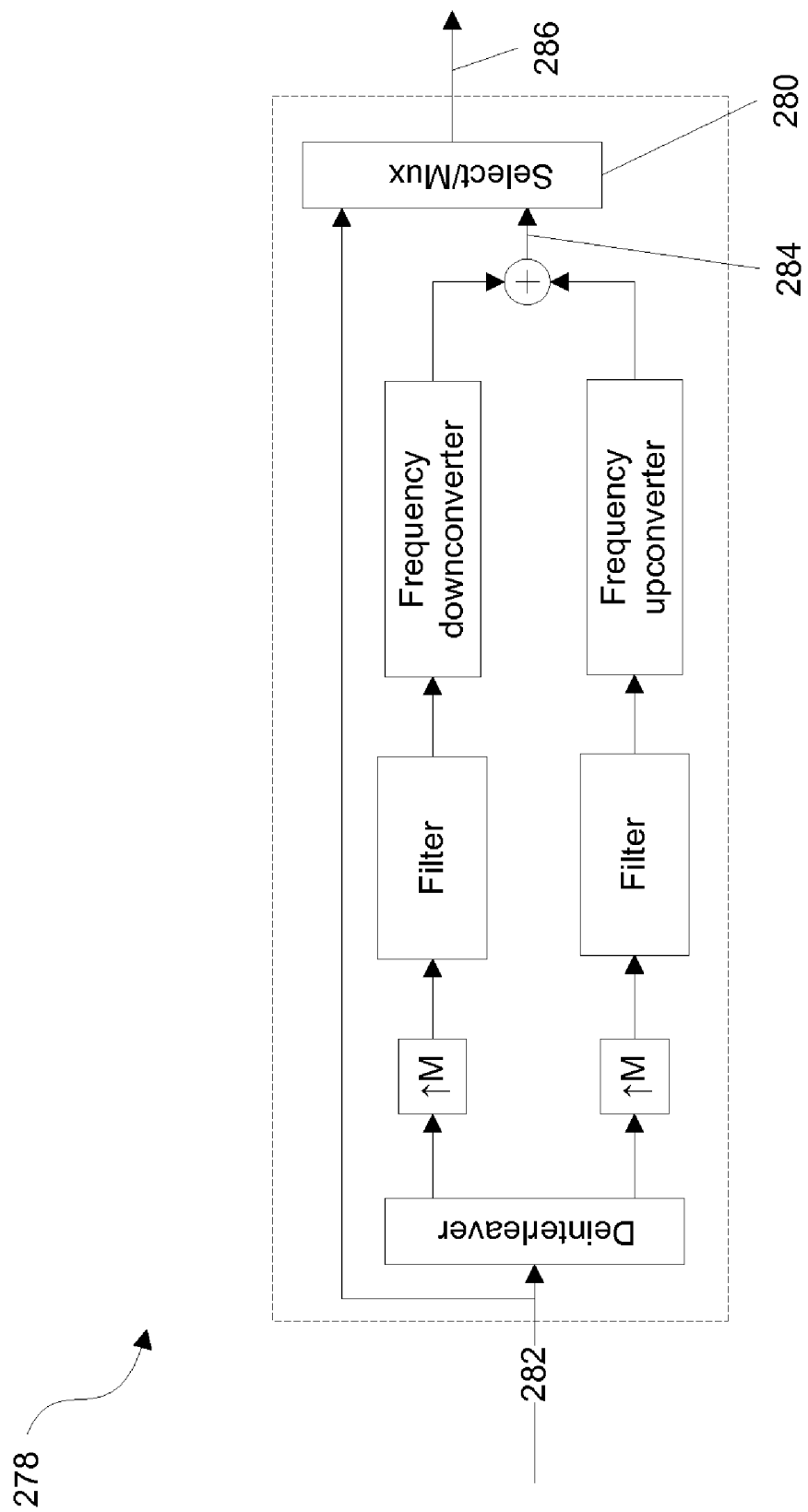
FIG. 16 is a block diagram of a third implementation of a combiner stage.

Referring to FIG. 16, a block diagram of a third implementation of a combiner stage 278 is illustrated. As illustrated, the stage 278 contains the components of the stage implementation illustrated in FIG. 14, but adds a selector multiplexer 280 that is coupled to the interleaved input 282 and to output 284. In response to control instructions included in interleaved input 282, the selector multiplexer 280 includes either a copy of the interleaved input 282 or the output 284 in a stage output 286. Because of the use of the selector multiplexer 280, channels of different bandwidths may be combined by allowing wider channels to "bypass" a particular combiner stage. An extensive discussion regarding the combination of variously sized channels and bypassing may be found in the '576 application, as well as additional disclosure regarding the use and structure of third implementations of combiner stages 278.

Figure 17:
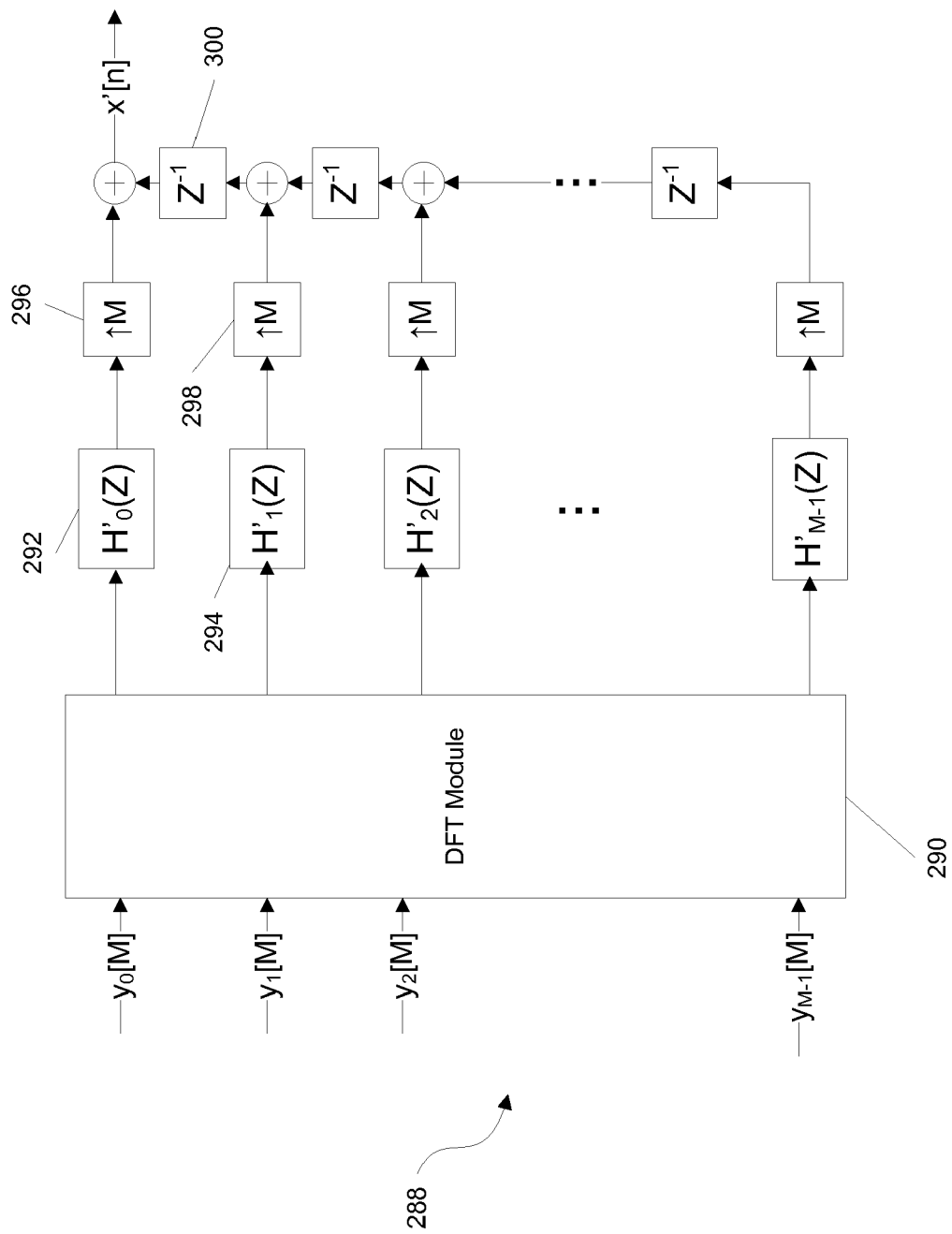
FIG. 17 is a block diagram of a third implementation of a combiner.

Referring to FIG. 17, a block diagram of a third implementation of a combiner (combiner bank) 288 is illustrated. As illustrated, the combiner 288 is a polyphase filter bank that includes a discrete Fourier transform (DFT) module 290 coupled to bandpass filters 292, 294 which are coupled to upsamplers 296, 298, respectively. Each of the respective combinations of bandpass filter and upsampler form a stage in the combiner 288. The outputs of the upsamplers 296, 298 are added and index marker 300 is used to ensure that the addition creates a wideband signal x'[n] that has the combined bandwidth of the various narrow band signals y[n]. Additional disclosure regarding the structure and operation of polyphase filter banks utilized for combining may be found in the paper written by Harris et al. previously incorporated by reference.

Figure 18:
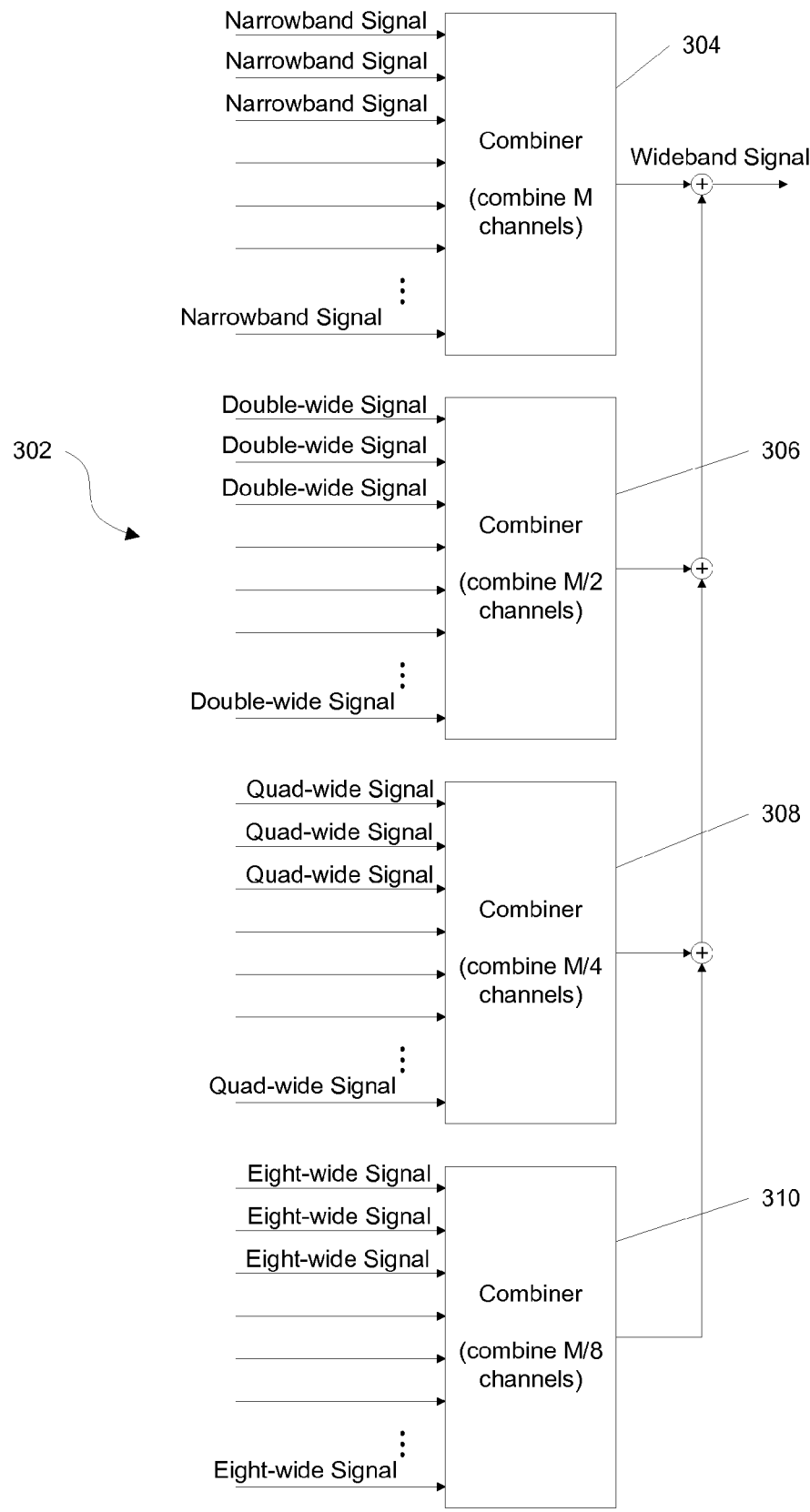
FIG. 18 is a block diagram of a fourth implementation of a combiner.

Referring to FIG. 18, a block diagram of a fourth implementation of a combiner 302 is illustrated. As illustrated, the combiner 302 includes a plurality of polyphase filter banks, 304, 306, 308, 310 each of which may be configured like those illustrated in FIG. 17. Implementations of combiners 302 may be used to combine channels of varying bandwidths by allowing for the processing and summing of a narrow band signal (combiner 304) with a double-wide signal (via combiner 306), a quad-wide signal (via combiner 308), or an eight-wide signal (via combiner 310). Because the outputs of the combiners 304, 306, 308, and 310 are summed, a wideband signal that has the bandwidth of all of the added signals is formed. The ability of the combiner 306 to handle double-wide signals is because the bandpass filters within the combiner 306 are configured to pass a bandwidth equal to twice that of the individual narrowband signals handed by combiner 304. In other words, the bandpass filters of combiner 306 are configured to pass a first number of channels through the filters and the bandpass filters of combiner 304 are configured to pass a second number of channels, where the first number is different from the second number. A control logic circuit like those previously discussed may be utilized to ensure that the output of each of the combiners 304, 306, 308, and 310 is placed in a proper position in the bandwidth of the wideband signal to ensure that it can be retrieved (i.e., follows the previously described constraints on the location of channels within the bandwidth of a received wideband signal or beam).

Implementations of burst processing modems like those disclosed in this document may allow for significant reduction in the number of modems needed to process the various channels of the beams a satellite is capable of utilizing. As a non-limiting example, the implementation illustrated in FIG. 1 is capable of handling 48 operational beams with 16 redundant beams available. In the implementation illustrated, 240 channels are available per beam, which means that the implementation in FIG. 1 is capable of processing 15,360 independent frequency channels with four modems. In contrast, conventional modems designed to handle a single channel would require the use of 15,360 modems to perform the equivalent work of the 4 modems like those illustrated in FIG. 1. This result is a consequence of the structure of the modems disclosed herein.

Figure 19:
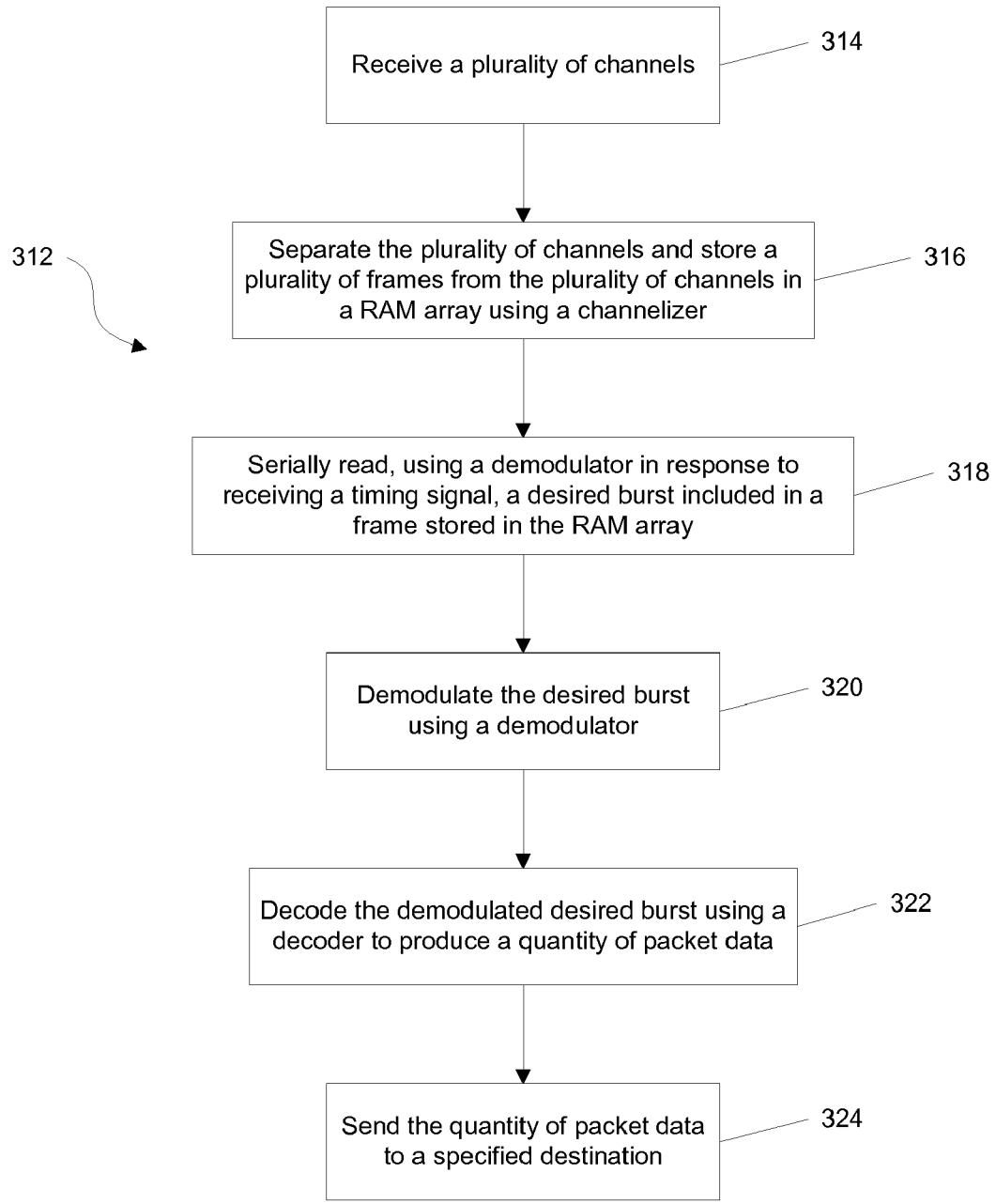
FIG. 19 is a flowchart of an implementation of a first method of demodulating bursts from a plurality of channels.

Referring to FIG. 19, an implementation of a method of demodulating bursts from a plurality of channels 312 that may be utilized by implementations of burst processing modems disclosed herein is illustrated. As illustrated, the method 312 may include receiving a plurality of channels (step 314), separating the plurality of channels and storing a plurality of frames from the plurality of channels in a RAM array using a channelizer (step 316), and serially reading, using a demodulator in response to receiving a timing signal, a desired burst included in a frame stored in the RAM array (step 318). The method 312 may also include demodulating the desired burst using a demodulator (step 320), decoding the demodulated desired burst using a decoder to produce a quantity of packet data (step 322), and sending the quantity of packet data to a specified destination (step 324). In various implementations, a burst time plan identifies the location of bursts within a particular frame, identifies which frame contains a particular burst, identifies the channel containing the frame, and may identify the beam including the channel. A burst time plan allows the step of serially reading to proceed by providing to the receive frame stage machine the information used to generate the timing signal used to recover the data associated with the burst from the RAM array. The quantity of packet data may take any of a wide variety of forms, such as, by non-limiting example, an Ethernet packet, a frame, an encapsulated packet, a portion of a data stream, and any other discrete or separable structure capable of transmitting data. The packet traffic processing module may use information in the quantity of packet data to perform the sending process (such as routing information in a packet header) or may receive the information needed to send the quantity of packet data from another source. When the quantity of packet data is an Ethernet packet, the burst processing modem may enable internet router in space (IRIS) functions.

Figure 20:
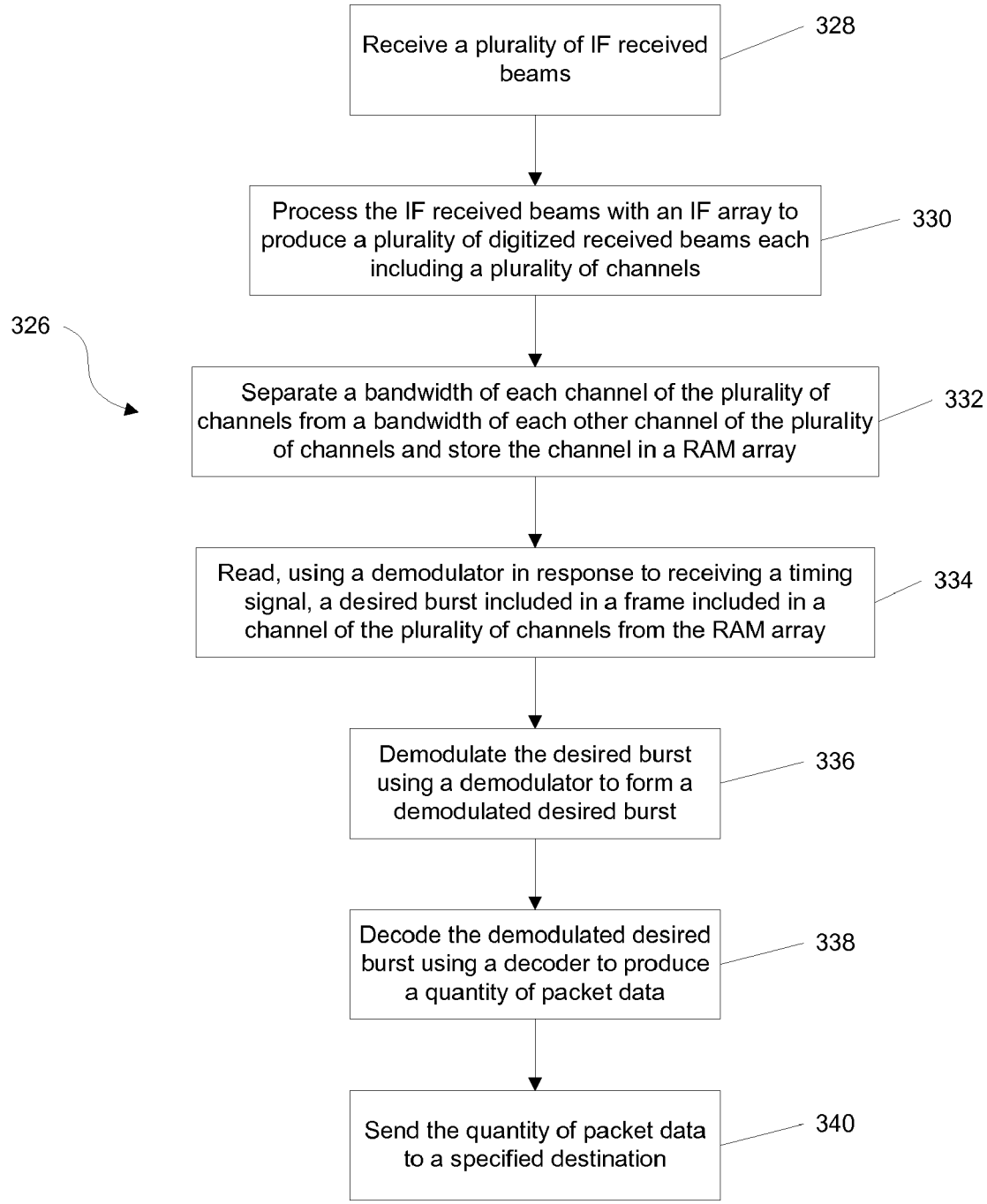
FIG. 20 is a flowchart of an implementation of a second method of demodulating bursts from a plurality of channels.

Referring to FIG. 20, an implementation of a second method of demodulating bursts from a plurality of channels 326 is illustrated. As shown, the method 326 may include receiving a plurality of IF received beams (step 328), processing the IF received beams with an IF array to produce a plurality of digitized received beams each including a plurality of channels (step 330), and separating a bandwidth of each channel of the plurality of channels from a bandwidth of each other channel of the plurality of channels and storing the channel in a RAM array (step 332). The method 326 may also include reading, using a demodulator in response to receiving a timing signal, a desired burst included in a frame included in a channel of the plurality of channels from the RAM array (step 334), demodulating the desired burst using a demodulator to form a demodulated desired burst (step 336), decoding the demodulated desired burst using a decoder to produce a quantity of packet data (step 338), and sending the quantity of packet data to a specified destination (step 340). In various implementations, the various parameters of the burst time plan may be used by the receive frame state machine to generate a timing signal that includes memory addresses within the RAM array where the desired burst is to be stored. A wide variety of memory addressing schemes and techniques may be employed when determining the organizational method for storing the bursts, frames, channels, and beams in the RAM array (and retrieving from the RAM array).

Implementations of first methods of demodulating bursts from a plurality of channels 312 and second methods of demodulating bursts from a plurality of channels 326 may include a number of additional method steps, depending on the particular implementation and the structure of the implementation of a burst processing modem that employs the method implementations. In implementations of burst processing modems that employ channelizers with implementations of stages like those illustrated in FIG. 3, in the methods 312, 326, separating the plurality of channels and/or separating the bandwidth of each channel of the plurality of channels included in the bandwidth of each of the digitized received beams from the bandwidth of each other channel of the plurality of channels may further include dividing the bandwidth of the input 42 to the stage 40 in the channelizer into a first copy and a second copy and frequency upconverting and filtering the first copy with frequency upconverter 44 and first filter 48 to create a first output 50 including a first channel. The methods 312, 326 may further include frequency downconverting and filtering the second copy with frequency downconverter 46 and second filter 52 to create a second output 54 including a second channel and interleaving the first output and the second output with interleaver 56 to produce an interleaved stage output signal 58.

In implementations of burst processing modems that employ channelizers with implementations of stages like those illustrated in FIG. 5, the methods 312, 326 may include downsampling the first output with a first downsampler 92 and downsampling the second output with a second downsampler 94 prior to interleaving the first output and the second output with interleaver 96. In implementations of burst processing modems that employ channelizers with implementations of stages like those illustrated in FIG. 7, the method 312, 326 may further include selecting when the output 124 of the interleaver and when a copy of the input 122 to the stage 118 is included in the interleaved stage output signal 126 using selector multiplexer 120 in response to a control signal in the input 122 to the stage 118. Relevant teachings regarding the form and structure of control signals that could be used may be found in the '576 application previously incorporated by reference.

In implementations of burst processing modems that employ channelizers with implementations of stages like those illustrated in FIG. 8, in the methods 312, 326 separating the plurality of channels and/or separating the bandwidth of each channel of the plurality of channels included in the bandwidth of each of the digitized received beams from the bandwidth of each other channel of the plurality of channels may further include processing the plurality of channels with a polyphase filter bank including a plurality of stages each including a downsampler 130, bandpass filter 134, and DFT module 138 to produce a desired channel (narrowband signal). In implementations of burst processing modems that employ channelizers with implementations of stages like those illustrated in FIG. 9, the methods 312, 326 may further include processing the plurality of channels with two or more polyphase filter banks 146, 148, 150, 152 wherein bandpass filters in the stages of one of the two or more polyphase filters banks 146, 148, 150, 152, pass a first number of channels per stage and bandpass filters in the stages of another of the two or more polyphase filter banks (polyphase filters) 146, 148, 150, 152 pass a second number of channels per stage where the second number is different than the first number.

Figure 21:
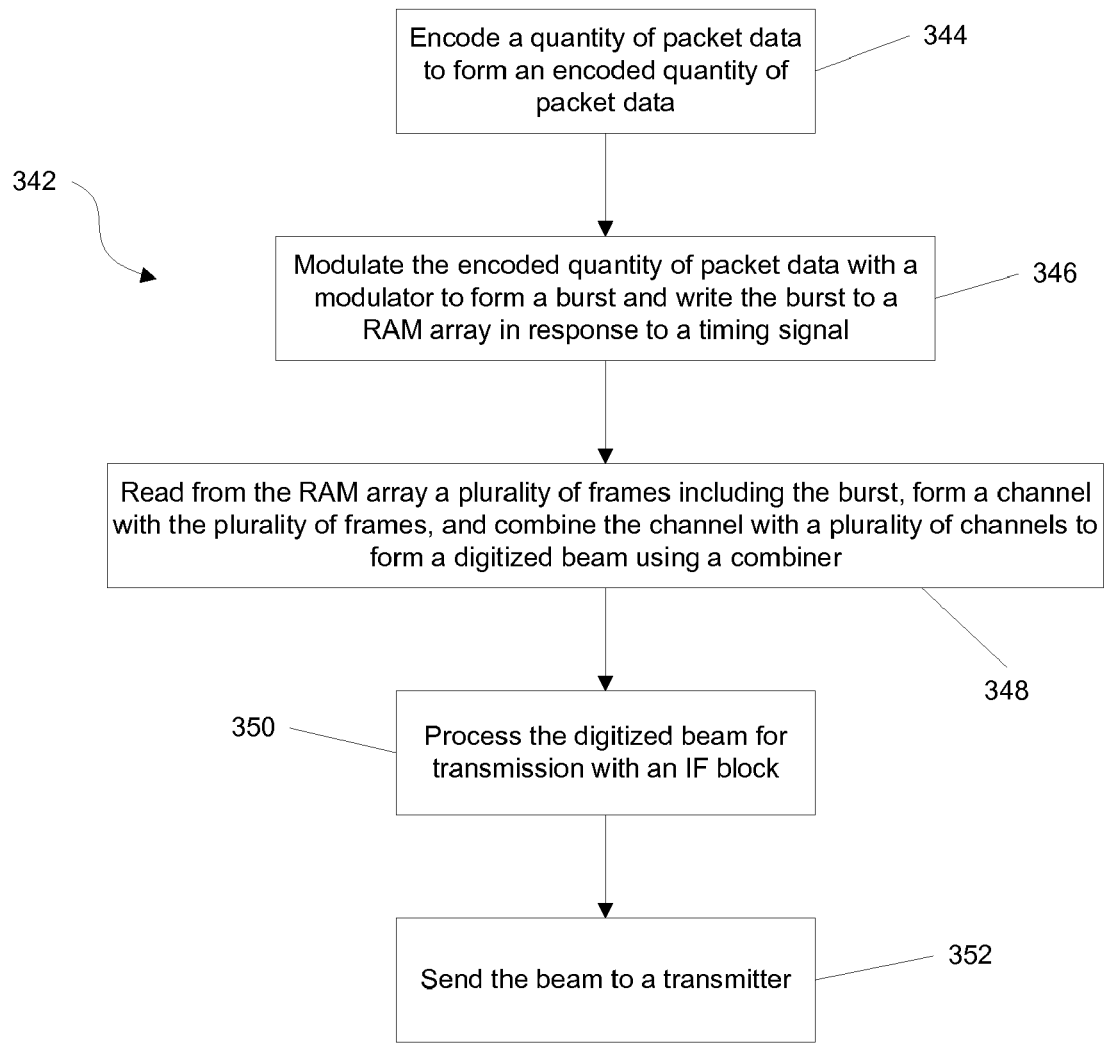
FIG. 21 is a flowchart of an implementation of a method of combining a plurality of channels including a plurality of frames.

Referring to FIG. 21, a flowchart of an implementation of a method of combining a plurality of channels comprising a plurality of frames comprising one or more bursts 342 is illustrated. As illustrated, the method 342 includes encoding a quantity of packet data to form an encoded quantity of packet data (step 344); modulating the encoded quantity of packet data with a modulator to form a burst and writing the burst to a RAM array in response to a timing signal (step 346); and reading from the RAM array a plurality of frames including the burst, forming a channel with the plurality of frames, and combining the channel with a plurality of channels to form a digitized beam using a combiner (step 348). The method 342 also includes processing the digitized beam for transmission with an IF block (step 350) and sending the beam to a transmitter (step 352). As was discussed before, the various parameters in the burst time plan can be used by a transmit frame state machine to generate a timing signal that includes a desired location of the burst in a frame, a desired channel for the frame, and, in particular implementations, a desired beam for the channel. In this way, the bursts can be stored in memory addresses within the RAM array in an order in which they will be needed by the modulator for inclusion in a particular channel and beam.

A wide variety of potential variations and/or additional portions of the method 342 are possible depending on the desired output and the structure of the burst processing modem utilizing the implementations of the method 342. In implementations of burst processing modems that employ combiners (combiner banks) with implementations of stages like those illustrated in FIG. 12, in the method 342, combining the channel with a plurality of channels may further include deinterleaving an input 192 to a stage 190 included in the combiner to form a first channel signal 196 and a second channel signal 198. The method also includes filtering the first channel signal 196 with first filter 200 to produce a filtered first channel signal and filtering the second channel signal 198 with second filter 206 to produce a filtered second channel signal. The method 342 also includes frequency downconverting the filtered first channel signal with frequency downconverter 204, frequency upconverting the filtered second channel signal with frequency upconverter 206, and adding an output of the frequency downconverter 204 to an output of the frequency upconverter 206 to produce a stage output signal 208 with an adder 210.

In implementations of burst processing modems that employ combiners with implementations of stages like those illustrated in FIG. 14, the method 342 may further include upsampling the first channel signal 238 with first upsampler 242 and upsampling the second channel signal 240 with second upsampler 252 prior to filtering the first channel signal 238 and filtering the second channel signal 240, respectively. In implementations of burst processing modems that employ combiners with implementations of stages like those illustrated in FIG. 16, the method 342 may further include selecting when an output 284 of the adder and a copy of the input 282 to the stage 278 are included in the stage output signal 286 in response to a control signal in the input 282 to the deinterleaver using selector multiplexer 280.

In implementations of burst processing modems that employ combiners with implementations of stages like those illustrated in FIG. 17, in the method 342, combining the channel with a plurality of channels may further include processing the plurality of channels with a polyphase filter bank 288 including a plurality of stages each including a DFT module 290 coupled with a bandpass filter 292 coupled with an upsampler 296 and adding an output of each upsampler 296 in each stage to form a digital beam signal for transmission. In implementations of burst processing modems that employ combiners with implementations of stages like those illustrated in FIG. 18, the method 342 may further include processing the plurality of channels with two or more polyphase filter banks 304, 306, 308, 310 where one of the two or more polyphase filter banks 304, 306, 308, 310 contains a plurality of bandpass filters that pass a first number of channels and a second one of the two or more polyphase filter banks 304, 306, 308, 310 contains a plurality of bandpass filters that pass a second number of channels where the first number is different than the second number. A wide variety of other potential method steps to support additional structural variations using the principles disclosed in this document are also possible.

In places where the description above refers to particular implementations of burst processing modems, it should be readily apparent that a number of modifications may be made without departing from the spirit thereof and that these implementations may be applied to other burst processing modems.

The invention claimed is:

1. A method of demodulating bursts from a plurality of channels, the method comprising:
    receiving a plurality of channels from a received beam;
    separating the plurality of channels and storing a plurality of frames included in the plurality of channels in a random access memory (RAM) array with a channelizer where each frame of the plurality of frames comprises one or more bursts;
    serially reading, using a demodulator in response to receiving a timing signal, a desired burst from a frame stored in the RAM array wherein a burst time plan identifying the desired burst is used by a receive frame state machine to generate the timing signal;
    demodulating the desired burst using a demodulator to form a demodulated desired burst;
    decoding the demodulated desired burst using a decoder to produce a quantity of packet data; and
    sending the quantity of packet data to a specified destination using a packet traffic processing module.

2. The method of claim 1, wherein separating the plurality of channels further comprises:
    dividing the bandwidth of an input to a stage in the channelizer into a first copy and a second copy;
    frequency upconverting and filtering the first copy with a frequency upconverter and first filter to create a first output including a first channel;
    frequency downconverting and filtering the second copy with a frequency downconverter and second filter to create a second output including a second channel; and
    interleaving the first output and the second output with an interleaver to produce an interleaved stage output signal.

3. The method of claim 2, further comprising downsampling the first output with a first downsampler and downsampling the second output with a second downsampler prior to interleaving the first output and the second output with an interleaver.

4. The method of claim 3, further comprising selecting when an output of the interleaver and when a copy of the input to the stage are included in the interleaved stage output signal using a selector multiplexer in response to a control signal in the input to the stage.

5. The method of claim 1, wherein separating the plurality of channels further comprises:
    processing the plurality of channels with a polyphase filter bank comprising a plurality of stages each comprising a downsampler, bandpass filter, and discrete Fourier transform (DFT) module to produce a desired channel.

6. The method of claim 5, further comprising processing the plurality of channels with two or more polyphase filter banks included in the channelizer wherein bandpass filters in the stages of one of the two or more polyphase filter banks pass a first number of channels per stage and bandpass filters in the stages of another of the two or more polyphase filter banks pass a second number of channels per stage, where the second number is different than the first number.

7. A method of demodulating bursts from a plurality of channels, the method comprising:
    receiving a plurality of intermediate frequency (IF) received beams;
    processing the IF received beams with an IF array to produce a plurality of digitized received beams, each digitized received beam comprising a plurality of channels;
    for each of the plurality of digitized received beams, separating a bandwidth of each channel of the plurality of channels included in a bandwidth of each of the digitized received beams from a bandwidth of each other channel of the plurality of channels and writing a plurality of frames included in the bandwidth of the channel into a random access memory (RAM) array with a channelizer;
    reading, using a demodulator in response to receiving a timing signal, a desired burst included in a frame of the plurality of frames from the RAM array from one or more memory addresses within the RAM array wherein the channel, frame, and a location of the desired burst within the frame is included a burst time plan, the burst time plan used by a receive frame state machine to generate the timing signal that includes the one or more memory addresses within the RAM array where the desired burst is stored;
    demodulating the desired burst using a demodulator to form a demodulated desired burst;
    decoding the demodulated desired burst using a decoder to produce a quantity of packet data; and
    sending the quantity of packet data to a specified destination using a packet traffic processing module.

8. The method of claim 7, wherein separating the bandwidth of each channel of the plurality of channels included in the bandwidth of each of the digitized received beams from the bandwidth of each other channel of the plurality of channels further comprises:
    dividing the bandwidth of an input to a stage in the channelizer into a first copy and a second copy;
    frequency upconverting and filtering the first copy with a frequency upconverter and first filter to create a first output including a first channel;
    frequency downconverting and filtering the second copy with a frequency downconverter and second filter to create a second output including a second channel; and interleaving the first output and the second output with an interleaver to produce an interleaved stage output signal.

9. The method of claim 8, further comprising downsampling the first output with a first downsampler and downsampling the second output with a second downsampler prior to interleaving the first output and the second output with an interleaver.

10. The method of claim 9, further comprising selecting when an output of the interleaver and when a copy of the input to the stage are included in the interleaved stage output signal using a selector multiplexer in response to a control signal in the input to the stage.

11. The method of claim 7, wherein separating the bandwidth of each channel of the plurality of channels included in the bandwidth of each of the digitized received beams from the bandwidth of each other channel of the plurality of channels further comprises:

processing the plurality of channels with a polyphase filter bank comprising a plurality of stages each comprising a downsampler, bandpass filter, and discrete Fourier transform (DFT) module to produce a desired channel.

12. The method of claim 11, further comprising processing the plurality of channels with two or more polyphase filter banks included in the channelizer wherein bandpass filters in the stages of one of the two or more polyphase filter banks pass a first number of channels per stage and bandpass filters in the stages of another of the two or more polyphase filter banks pass a second number of channels per stage, where the second number is different than the first number.

13. A method of combining a plurality of channels comprising a plurality of frames comprising one or more bursts, the method comprising:

encoding a quantity of packet data received from a packet traffic processing module to form an encoded quantity of packet data using an encoder;

modulating the encoded quantity of packet data using a single modulator to form a burst and writing the burst to a specified location in a random access memory (RAM) array in response to receiving the specified location from a timing signal received from a transmit frame state machine that generates the specified location from a burst time plan that includes a desired location of the burst in a frame, a desired channel for the frame, and a desired beam for the channel;

reading from the RAM array a plurality of frames that includes the burst, forming a channel with the plurality of frames, and combining the channel with a plurality of channels to form a digitized beam for transmission using a combiner;

processing the digitized beam for transmission with an IF block to form a beam; and sending the beam to a transmitter.

14. The method of claim 13, wherein combining the channel with a plurality of channels further comprises:

deinterleaving an input to a stage included in the combiner to form a first channel signal and a second channel signal;

filtering the first channel signal with a first filter to produce a filtered first channel signal and filtering the second channel signal with a second filter to produce a filtered second channel signal;

frequency downconverting the filtered first channel signal with a frequency downconverter and frequency upconverting the filtered second channel signal with a frequency upconverter;

adding an output of the frequency downconverter to an output of the frequency upconverter to produce a stage output signal with an adder.

15. The method of claim 14, further comprising upsampling the first channel signal with a first upsampler and upsampling the second channel signal with a second upsampler prior to filtering the first channel signal and filtering the second channel signal, respectively.

16. The method of claim 15, further comprising selecting when an output of the adder and a copy of the input to the stage are included in the stage output signal in response to a control signal in the input to the deinterleaver using a selector multiplexer.

17. The method of claim 13, wherein combining the channel with a plurality of channels further comprises processing the plurality of channels with a polyphase filter bank including a plurality of stages each including a discrete Fourier transform (DFT) module coupled with a bandpass filter coupled with an upsampler and adding an output of each upsampler in each stage to form a digital beam signal for transmission.

18. The method of claim 17, further comprising processing the plurality of channels with two or more polyphase filter banks where one of the two or more polyphase filter banks contains a plurality of bandpass filters that pass a first number of channels and a second one of the two or more polyphase filter banks contains a plurality of bandpass filters that pass a second number of channels where the first number is different than the second number.

* * * * *